US012675752B2

(12) United States Patent (10) Patent No.: US 12,675,752 B2

Kawai et al. (45) Date of Patent: Jul. 7, 2026

(54) SCHEDULE CREATION METHOD, SCHEDULE CREATING DEVICE, SUBSTRATE PROCESSING APPARATUS, SUBSTRATE PROCESSING SYSTEM, AND STORAGE MEDIUM

(71) Applicant: SCREEN HOLDINGS CO., LTD., Kyoto (JP)

(72) Inventors: Jun Kawai, Kyoto (JP); Takashi Kasahara, Kyoto (JP); Keisuke Inugai, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 1000 days.

(21) Appl. No.: 17/877,082

(22) Filed: Jul. 29, 2022

(65) Prior Publication Data

US 2023/0041766 A1    Feb. 9, 2023

(30) Foreign Application Priority Data

Jul. 30, 2021    (JP) ................................ 2021-125528

(51) Int. Cl.
*G06Q 10/0631* (2023.01)
*G05B 19/418* (2006.01)
(Continued)

(52) U.S. Cl.
CPC . *G06Q 10/06311* (2013.01); *G05B 19/41865* (2013.01); *G06N 20/00* (2019.01); *G06Q 30/0235* (2013.01)

(58) Field of Classification Search
CPC .......................... G06N 20/00; G05B 19/41865
See application file for complete search history.

(56) References Cited

U.S. PATENT DOCUMENTS

| | | | |
|---|---|---|---|
| 7,801,633 B2 | 9/2010 | Yamamoto et al. | |
| 11,568,232 B2 | 1/2023 | Huang et al. | |
| | (Continued) | | |

FOREIGN PATENT DOCUMENTS

| | | |
|---|---|---|
| CN | 102016730 A | 4/2011 |
| CN | 102449623 A | 5/2012 |
| | (Continued) | |

OTHER PUBLICATIONS

Taiwanese Office Action issued in corresponding Taiwanese Patent Application No. 111127899, Feb. 23, 2023.

*Primary Examiner* — Eric Nilsson

(74) *Attorney, Agent, or Firm* — Rimon P.C.

(57) ABSTRACT

A schedule creation method is a method for creating a time schedule by executing a learning step multiple times. The learning step includes sequentially placing patterns each indicating a procedure in a processing sequence in a timetable for defining a time schedule for respective elements of a substrate processing apparatus. The sequentially placing patterns in a timetable includes: acquiring one or more placeable patterns that are allowed to be placed in the timetable from among the patterns based on a prescribed constraint condition; predicting and selecting through machine learning a pattern that makes an evaluation value maximum from among the one or more placeable patterns; and updating the timetable by placing the selected pattern in the timetable.

11 Claims, 17 Drawing Sheets

(51) Int. Cl.
  *G06N 20/00*    (2019.01)
  *G06Q 30/0235*   (2023.01)

(56)      References Cited

U.S. PATENT DOCUMENTS

| | | |
|---|---|---|
| 2004/0048461 A1 | 3/2004 | Chen et al. |
| 2009/0018686 A1 | 1/2009 | Yamamoto et al. |
| 2017/0227950 A1 | 8/2017 | Kinoshita et al. |
| 2019/0244095 A1 | 8/2019 | Huang et al. |
| 2020/0267053 A1 | 8/2020 | Zheng et al. |
| 2020/0279163 A1 | 9/2020 | Bengio et al. |
| 2021/0391188 A1 | 12/2021 | Inoue et al. |
| 2022/0164756 A1 | 5/2022 | Saihara |
| 2022/0171373 A1* | 6/2022 | Chau ................ G05B 19/41885 |
| 2022/0343150 A1* | 10/2022 | Sousa .................. G06N 3/0499 |

FOREIGN PATENT DOCUMENTS

| | | | |
|---|---|---|---|
| CN | 112805983 | A | 5/2021 |
| CN | 112840439 | A | 5/2021 |
| EP | 1791169 | A1 | 5/2007 |
| JP | 2009-048320 | A | 3/2009 |
| JP | 2015-052998 | A | 3/2015 |
| JP | 2017-142595 | A | 8/2017 |
| JP | 2020-177565 | A | 10/2020 |
| JP | 2021-026507 | A | 2/2021 |
| JP | 2021-064049 | A | 4/2021 |
| KR | 2018-0005843 | A | 1/2018 |
| TW | 201935264 | A | 9/2019 |
| TW | 202101138 | A | 1/2021 |
| WO | 2009/114382 | A1 | 9/2009 |
| WO | 2010/114641 | A1 | 10/2010 |
| WO | 2020/225995 | A1 | 11/2020 |

* cited by examiner

|  |  | PT | TA |
|---|---|---|---|
| BL1 | A | Indexer robot (bringing-out) | t=0 |
| BL2 | B | Indexer robot (brining-in) | t=1 |
|  | C | Delivery section (bringing-in) | t=1 |
| BL3 | D | Delivery section (bringing-out) | t=2 |
|  | E | Transport robot (brining-out) | t=2 |
| BL4 | F | Transport robot (brining-in) | t=3 |
|  | G | Processing unit | t=3 |
|  | H | Transport robot (brining-out) | t=9 |
| BL5 | I | Transport robot (brining-in) | t=10 |
|  | J | Delivery section (bringing-in) | t=10 |
| BL6 | K | Delivery section (bringing-out) | t=11 |
|  | L | Indexer robot (bringing-out) | t=11 |
| BL7 | M | Indexer robot (bringing-in) | t=12 |

| A | Transport robot (gripping) |
|---|---|
| B | Transport robot (transport) |
| C | Processing section |
| D | Transport robot (gripping) |
| E | Transport robot (transport) |

SCHEDULE CREATION METHOD, SCHEDULE CREATING DEVICE, SUBSTRATE PROCESSING APPARATUS, SUBSTRATE PROCESSING SYSTEM, AND STORAGE MEDIUM

INCORPORATION BY REFERENCE

The present application claims priority under 35 U.S.C. § 119 to Japanese Patent Application No. 2021-125528, filed on Jul. 30, 2021. The contents of this application are incorporated herein by reference in their entirety.

TECHNICAL FIELD

The subject matter of the present application relates to a schedule creation method, a schedule creating device, a substrate processing apparatus, a substrate processing system, and a storage medium.

BACKGROUND ART

A method for creating a substrate processing apparatus schedule is known. The method for creating a substrate processing apparatus schedule is a method for creating a time schedule for each element of a substrate processing apparatus. According to the method for creating a substrate processing apparatus schedule, a time schedule can be created according to which the substrate processing apparatus can efficiently process substrates in substrate units (in each unit of one substrate) or in lot units (e.g., in each unit of 25 substrates). A schedule creation method for creating a time schedule for each element of a substrate processing apparatus in lot units is suitably implemented by a batch-type substrate processing apparatus.

The method for creating a substrate processing apparatus schedule is implemented by execution of a computer program by a controller including for example a central processing unit (CPU), a counter, and a timer. As such, a developer of the schedule creation method develops a flow of processing executed by the CPU. Specifically, the developer determines a rule (constraint) in consideration of the apparatus configuration of a substrate processing apparatus and develops the flow so that a time schedule reflecting the determined rule is created.

SUMMARY

However, in a case in which a rule (constraint) is determined in consideration of the apparatus configuration of a substrate processing apparatus and the flow is developed so that a time schedule reflecting the determined rule is created, the developer is required to develop the entire flow for each model of substrate processing apparatuses due to different models having different apparatus configurations. As such, there is room for further improvement when considering the burden on the developer.

According to an aspect of the present disclosure, a schedule creation method is a method for creating through machine learning a time schedule for respective elements of a substrate processing apparatus relating to a substrate processing sequence. The method includes creating the time schedule by executing a learning step multiple times. The leaning step includes sequentially placing patterns in a timetable for defining the time schedule for the elements of the substrate processing apparatus, the patterns being prepared in advance and each indicating a procedure in the substrate processing sequence; and acquiring an evaluation value after all the patterns have been placed in the timetable. The sequentially placing patterns in a timetable includes: acquiring one or more placeable patterns that are allowed to be placed in the timetable from among the patterns based on a prescribed constraint condition; predicting and selecting through the machine learning a pattern that makes art evaluation value maximum from among the one or more placeable patterns; and updating the timetable by placing the selected pattern in the timetable. The acquiring an evaluation value includes: acquiring a final reward based on the timetable in which all the patterns have been placed; and calculating the evaluation value based on a reward including the final reward.

In an embodiment, the constraint condition includes a condition for acquiring from among the patterns a succeedingly placeable pattern that is allowed to be placed next according to an order of the substrate processing sequence.

In an embodiment, the constraint condition includes a condition for prohibiting execution of an operation that the substrate processing apparatus is physically disabled to perform.

In an embodiment, the elements of the substrate processing apparatus include a plurality of processing sections that each perform substrate processing. The final reward includes a first final reward that is a positive reward. The acquiring a final reward includes: specifying a last processing section that is a processing section of the processing sections that performs the substrate processing last; acquiring a time at which the last processing section performs the substrate processing last from among times indicated by the timetable; and acquiring the first final reward based on the acquired time.

In an embodiment, the elements of the substrate processing apparatus include a plurality of processing sections that each perform substrate processing. The final reward includes a second final reward that is a positive reward. The acquiring a final reward includes: acquiring first times and second times from times indicated by the timetable, the first times each being a time at which a corresponding one of the processing sections performs the substrate processing first, the second times each being a time at which a corresponding one of the processing sections performs the substrate processing last; acquiring elapsed times from the first times to the second times of the respective processing sections; and acquiring the second final reward based on a distribution of the elapsed times.

In art embodiment, the reward further includes an intermediate reward. The schedule creation method includes: determining, after the updating the timetable by placing the selected pattern in the timetable, whether or not a pattern of the patterns that is placed latest in the timetable meets a prescribed intermediate reward grant condition; and acquiring the intermediate reward when it is determined that the pattern placed latest meets the prescribed intermediate reward grant condition.

In an embodiment, the calculating an evaluation value includes: acquiring a time corresponding to a position of the pattern that meets the prescribed intermediate reward grant condition from among times indicated by the timetable; determining whether or not to allocate a discount rate to the intermediate reward based on the acquired time; and calculating, when it is determined to allocate the discount rate to the intermediate reward, a value of the discount rate according to the acquired time.

In an embodiment, the elements of the substrate processing apparatus include a transport robot capable of transporting a plurality of substrates simultaneously. The intermediate reward includes a first intermediate reward that is a positive reward. The intermediate reward grant condition includes a first intermediate reward grant condition corresponding to the first intermediate reward. The first intermediate reward grant condition indicates simultaneous transport of mutually different substrates by the transport robot.

In an embodiment, the elements of the substrate processing apparatus include a processing section that performs substrate processing. The intermediate reward includes a second intermediate reward that is a positive reward. The intermediate reward grant condition includes a second intermediate reward grant condition corresponding to the second intermediate reward. The second intermediate reward grant condition indicates bringing-in of a substrate into the processing section directly after bringing-out of another substrate from the processing section.

In an embodiment, the patterns includes a first pattern and a second pattern. Of times indicated by the timetable, a time corresponding to a position at which the first pattern is placed is earlier than a time at which the second pattern is placed. The intermediate reward includes a third intermediate reward that is a negative reward. The intermediate reward grant condition includes a third intermediate reward grant condition corresponding to the third intermediate reward. The third intermediate reward grant condition indicates placement of the first pattern in the timetable after placement of the second pattern in the timetable.

According to another aspect of the present disclosure, a schedule creating device of a first aspect creates through machine learning a time schedule for respective elements of a substrate processing apparatus relating to a substrate processing sequence. The schedule creating device includes an operation section that creates the time schedule by executing a learning step multiple times. The learning step is processing of: sequentially placing patterns in a timetable for defining the time schedule for the elements of the substrate processing apparatus, the patterns being prepared in advance and each indicating a procedure in the substrate processing sequence; and acquiring an evaluation value after all the patterns have been placed in the timetable. The operation section acquires one or more placeable patterns that are allowed to be placed in the timetable from among the patterns based on a prescribed constraint condition. The operation section predicts and selects through the machine leaning a pattern that makes an evaluation value maximum from among the one or more placeable patterns. The operation section updates the timetable by placing the selected pattern in the timetable. When all the patterns prepared in advance are placed in the timetable, the operation section acquires a final reward based on the timetable in which all the patterns have been placed, and calculates the evaluation value based on a reward including the final reward.

According to still another aspect of the present disclosure, a substrate processing apparatus includes: respective elements relating to a substrate processing sequence; and the schedule creating device according to the first aspect. The operation section included in the schedule creating device manages schedules of the respective elements based on the created time schedule.

According to still another aspect of the present disclosure, a schedule creating device of a second aspect creates through machine learning a time schedule for respective elements of a substrate processing apparatus relating to a substrate processing sequence. The schedule creating device includes a first operation section and a second operation section that create the time schedule by executing a learning step multiple times. The learning step is processing of: sequentially placing patterns in a timetable for defining the Lime schedule for each of the elements of the substrate processing apparatus, the patterns being prepared in advance and each indicating a procedure in the substrate processing sequence; and acquiring an evaluation value after all the patterns have been placed in the time table. The first operation acquires one or more placeable patterns that are allowed to be placed in the timetable from among the patterns based on a prescribed constraint condition, and inputs information indicating the placeable patterns to the second operation section. The second operation section predicts and selects through the machine leaning a pattern that makes an evaluation value maximum from among the one or more placeable patterns obtained by the first operation, and inputs information indicating the selected pattern to the first operation section. The first operation section updates the timetable by placing the pattern selected by the second operation section in the timetable. When all the patterns prepared in advance are placed in the timetable, the first operation section acquires a final reward based on the timetable in which all the patterns have been placed, and calculates the evaluation value based on a reward including the final reward.

According to still another aspect of the present disclosure, a substrate processing apparatus induces: respective elements relating to a substrate processing sequence; and the schedule creating device according to the second aspect. The first operation section included in the schedule creating device manages schedules of the respective elements based on the created time schedule.

According to still another aspect of the present disclosure, a substrate processing system includes: the schedule creating device according to the first or second aspect; and a substrate processing apparatus connected to the schedule creating device in a communicable manner. The substrate processing apparatus includes: respective elements relating to a substrate processing sequence; a receiving section; and a managing section. The receiving section receives the time schedule from the schedule creating device. The managing section manages schedules of the respective elements based on the time schedule received by the receiving section.

According to still another aspect of the present disclosure, a storage medium is a non-transitory computer-readable storage medium in which a schedule creation program executed by a computer is stored. The schedule creation program causes the computer to perform operation according to the above-described schedule creation method.

BRIEF DESCRIPTION OF DRAWINGS

FIG. 3 is a diagram illustrating examples of patterns.

DETAILED DESCRIPTION

Figure 1:
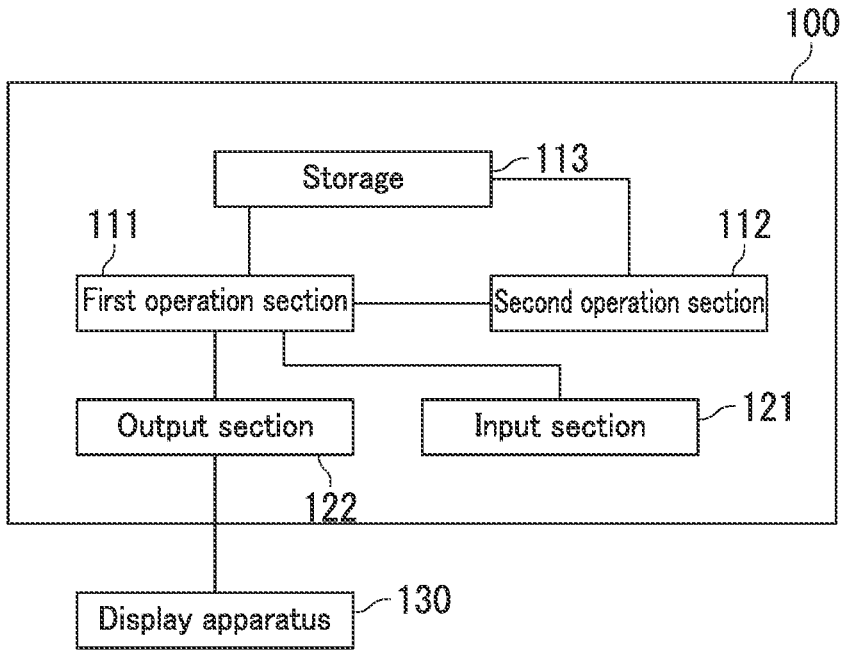
FIG. 1 is a block diagram of the configuration of a schedule creating device according to a first embodiment.

The following described embodiments of a time schedule creation method, a schedule creating device, a substrate processing apparatus, a substrate processing system, and a storage medium, which are the subject matter of the present application, with reference to the accompanying drawings (FIGS. 1 to 22). However, the subject matter of the present application is not limited to the following embodiments and can be practiced in various manners within a scope not departing from the gist thereof. Note that description is omitted where appropriate in order to avoid repetition but such omission does not limit the present disclosure. Furthermore, elements that are the same or equivalent are indicated by the same reference signs in the drawings and description thereof is not repeated.

To "substrates", various substrates are applicable in the following embodiments, such as semiconductor wafers, glass substrates for photomask use, glass substrates for liquid crystal display use, glass substrates for plasma display use, substrates for field emission display (FED) use, substrates for optical disk use, substrates for magnetic disk use, and substrates for magneto-optical disk use. The following describes embodiments mainly using as examples a schedule creation method, a schedule creating device, a substrate processing apparatus, a substrate processing system, and a storage medium that are used for processing disk-shaped semiconductor wafers. However, the present disclosure is likewise applicable to processing on any of the substrates listed above. Furthermore, the substrates may have any shape.

First Embodiment

The following describes a first embodiment with reference to FIGS. 1 to 17. First of all, a schedule creating device 100 of the present embodiment will be described with reference to FIG. 1. FIG. 1 is a block diagram of a configuration of the schedule creating device 100 of the present embodiment. The schedule creating device 100 creates through machine learning a time schedule for each element of a substrate processing apparatus WP relating to a processing sequence (recipe) of a substrate W.

For example, in a case in which the substrate processing apparatus WP is of single-wafer type, the elements relating to the processing sequence may include a hand of an indexer robot IR, a delivery section PS, a hand of a transport robot CR, and a processing section PU (chamber). The elements may further include a substrate container C. In a case in which the processing section PU processes a substrate W with a processing liquid, the elements may further include a processing liquid supply unit PL that supplies the processing liquid to the processing section PU.

The hand of the indexer robot IR may include a hand capable of gripping a plurality of substrates W simultaneously. Furthermore, the hand of the indexer robot IR may be a plurality of hands that operate independently. The hand of the transport robot CR may include a plurality of hands that operate independently.

In a case in which the substrate processing apparatus WP is of single-wafer type including a delivery section PS, the indexer robot IR transports a substrate W between the substrate container C and the delivery section PS and the transport robot CR transports the substrates W between the processing section PU and the delivery section PS. The delivery section PS may include a reversing mechanism that reverses the substrate W or may not include the reversing mechanism. The delivery section PS may be omitted. In a case in which the substrate processing apparatus WP is of single-wafer type not including the delivery section PS, the indexer robot IR transports a substrate W between the substrate container C and the transport robot CR and the transport robot CR transports the substrate W between the processing section PU and the indexer robot IR.

The processing section PU performs processing on a substrate W (substrate processing). No particular limitations are placed on the details of the substrate processing performed by the processing section PU, and the processing section PU performs on a substrate W processing with a processing agent (e.g., the processing liquid, a processing gas, or the processing liquid and the processing gas), processing using electromagnetic waves such as ultraviolet rays, or physical cleaning processing (e.g., brush cleaning or splay nozzle cleaning). Specifically, the substrate processing performed by the processing section PU may be any of chemical liquid cleaning, brush cleaning, etching, photosensitive mask application, development, annealing, and plotting. The substrate processing apparatus WP may include a plurality of processing sections PU that perform mutually different processing.

As illustrated in FIG. 1, the schedule creating device 100 includes a first operation section 111, a second operation section 112, and storage 113. In the following, a time schedule for each element of the substrate processing apparatus WP relating to the processing sequence of a substrate W may be referred to as "time schedule".

The first operation section 111 and the second operation section 112 each execute a learning step multiple times to create a dine schedule. The learning step is processing of: sequentially placing patterns PT prepared in advance, each of which indicates a procedure in the processing sequence, in a timetable TB for defining a time schedule for each element of the substrate processing apparatus WP; and acquiring an evaluation value after all the patterns PT have been placed in the timetable TB. The number of times the learning step is repeated is preset. For example, the first operation section 111 and the second operation section 112 may repeat the learning step until the evaluation value or a reward converges. Patterns PT to be sequentially placed in the timetable TB during the time when the learning step is executed one time are patterns that have not yet been placed in the timetable TB. In the following, the patterns PT to be sequentially placed in the timetable TB during the time when the learning step is executed one time may each be referred to as "unplaced pattern NPT".

The first operation section 111 includes a processor. The first operation section 111 includes a central processing unit (CPU) or a microprocessing unit, for example. Alternatively, the first operation section 111 may include a general-purpose arithmetic unit or a dedicated arithmetic unit. The dedicated arithmetic unit includes a field-programmable gate array (FPGA) or an application specific integrated circuit (ASIC), for example. The first operation section 111 executes a first control program (computer program) stored in the storage 113 to perform various processing. The first control program is a part of a schedule creation program. The storage 113 includes a storage medium that stores the schedule creation program therein.

Specifically, the first operation section 111 acquires based on a prescribed constraint condition succeedingly one or more placeable patterns APT that are allowed to be placed next from among the unplaced patterns NPT. In the following, processing of acquiring the succeedingly placeable patterns APT from among the unplaced patterns NPT based on the prescribed constraint condition may be referred to as "succeedingly placeable pattern acquisition processing". Note that the constraint condition is pre-stored in the storage 113.

The patterns PT are prepared in advance for each of a preset number of substrates W. For example, in a case in which the number of procedures included in a processing sequence for processing one substrate W is X and the preset number of substrates W is 25, the total number of the patterns PT is "25×X. Note that in the initial stage in which none of the patterns PT are placed in the timetable TB, all the patterns PT are unplaced patterns NPT. Each time a pattern PT is placed in the timetable TB as the processing advances, the number of the unplaced patterns NPT decreases.

The constraint condition depends on the apparatus configuration of the substrate processing apparatus WP. Example of the constraint condition includes a condition for processing a substrate W in the order of procedures (processing) defined in a processing sequence (recipe) and a condition for prohibiting a physically disabled act in the substrate processing apparatus WP.

The succeedingly placeable patterns APT each are a pattern PT that is allowed to be placed in the timetable TB at the current stage. In detail, when at least one pattern PT has been placed in the timetable TB, a pattern PT corresponding to a procedure (processing) to be performed next to the at least one pattern PT corresponds to a succeedingly placeable pattern APT. However, even a pattern PT corresponding to the procedure (processing) to be performed next may not correspond to a succeedingly placeable pattern APT depending on the constraint condition. Specifically, when a pattern PT corresponding to the procedure (processing) to be performed next corresponds to a physically disabled act in the substrate processing apparatus WP, the pattern PT does not correspond to a succeedingly placeable pattern APT and accordingly is not acquired as the succeedingly replaceable pattern. APT.

The succeedingly placeable patterns APT change each time the timetable TB is updated. In other words, the succeedingly placeable patterns APT change each time an unplaced pattern NPT is placed in the timetable TB.

For example, when the constraint condition includes constraint conditions 1 to 4 shown below in Table 1 and the processing sequence includes procedures 1 to 3 (patterns 1 to 3) shown below in Table 2, the succeedingly placeable pattern APT in tyre initial stage is the procedure 1 (pattern 1-W1) which is for a first substrate W1 (uppermost substrate W) of substrates W stacked in the substrate container C. The succeedingly placeable pattern APT after the pattern 1-W1 is placed in the timetable TB is the procedure 2 (pattern 2-W1) which is for the first substrate W1. The succeedingly placeable pattern APT after the pattern 2-W1 is placed in the timetable TB includes the procedure 3 (pattern 3-W1) which is for the first substrate W1 and the procedure 1 pattern 1-W2) which is for a second substrate W2 (uppermost substrate W) stacked in the substrate container C.

TABLE 1

| Constraint condition | Details of constraint condition |
| --- | --- |
| Constraint condition 1 | Processing proceeds in the order of the processing sequence |
| Constraint condition 2 | The maximum number of substrates that the indexer robot IR is capable of transporting is one |
| Constraint condition 3 | The maximum number of substrates that the transport robot CR is capable of transporting is one |
| Constraint condition 4 | Processing section PU processes substrates W one at a time |

TABLE 2

| Processing sequence | Details of processing |
| --- | --- |
| Procedure 1 (pattern 1) | Processing of bringing a substrate W out of the substrate container C by the indexer robot IR |
| Procedure 2 (pattern 2) | Processing of transporting a substrate W to the delivery section PS by the indexer robot IR |
| Procedure 3 (pattern 3) | Processing of bringing a substrate W out of the delivery section PS by the transport robot CR |

The second operation section 112 includes a processor. The second operation section 112 includes a CPU or a MPU, for example. Alternatively, the second operation section 112 may include a general-purpose arithmetic unit, a dedicated arithmetic unit, a neural network processing unit (NCU), or a quantum computer. The dedicated arithmetic unit includes a FPGA or an ASIC, for example. The second operation section 112 receives information indicating the succeedingly placeable patterns APT from the first operation section 111. In detail, the first operation section 111 inputs the information indicating the succeedingly placeable patterns APT, information indicating the timetable TB at the current stage, and information indicating each unplaced pattern NPT at the current stage to the second operation section 112.

The second operation section 112 executes a second control program (computer program) stored in the storage 113 to predict and select a succeedingly placeable pattern APT that makes the evaluation value maximum from among the succeedingly placeable patterns APT acquired by the first operation section 111. The second control program is a part of the schedule creation program.

In detail, the second control program includes a program of machine learning. More specifically, the second control program includes a program of reinforcement learning. No particular limitations are placed on the algorithm of the reinforcement learning, and the algorithm of the reinforcement learning may be an algorithm in compliance with the Q learning, the SARSA method, the policy gradient method, the Actor-Critic method, or the Monte Carlo method. The second control program (algorithm of the reinforcement learning) builds a predictive model. The predictive model predicts an evaluation value (Q value) for each of the succeedingly placeable patterns APT. In the following, the evaluation value predicted by the second operation section 112 may be referred to as "predictive evaluation value".

The predictive model includes a neural network, for example. The neural network includes an input layer, a single or plurality of intermediate layers, and an output layer. Specifically, the neural network is a deep neural network (DNN), a recurrent neural network (RNN), a convolutional neural network (CNN), or a quantum neural network (QNN), and performs deep learning. The deep neural network includes an input layer, a plurality of intermediate layers (hidden layers), and an output layer, for example.

The second operation section 112 selects one of the succeedingly placeable patterns APT based on the predictive evaluation value. Specifically, the second operation section 112 selects a succeedingly placeable pattern APT that makes the predictive evaluation value maximum.

For example, as described with reference to Tables 1 and 2, when the succeedingly placeable patterns APT after placement of the pattern 2-W1 in the timetable TB include the procedure 3 (pattern 3-W1) which is for the first substrate W1 and the procedure 1 (pattern 1-W2) which is for the second substrate W2 (uppermost substrate W), the second operation section 112 calculates a predicted evaluation value when the pattern 3-W1 is placed in the timetable and a predictive evaluation value when the pattern 1-W2 is placed in the timetable TB, and selects one of the patterns 3-W1 and 1-W2 based on the calculated predictive evaluation values.

Upon selecting the succeedingly placeable pattern APT, the second operation section 112 inputs information indicating the selected succeedingly placeable pattern APT to the first operation section 111. In the following, the processing of predicting and selecting a succeedingly placeable pattern APT that makes the evaluation value maximum from among the succeedingly placeable patterns APT acquired by the first operation section 111 may be referred to as "succeedingly placeable pattern selection processing".

The first operation section 111 updates the timetable TB by placing the succeedingly placeable pattern APT selected by the second operation section 112 in the timetable TB. The first operation section 111 also updates each unplaced pattern NPT in response to placement of the succeedingly placeable pattern NPT in the timetable TB. In the following, the processing of updating the timetable TB by placing the succeedingly placeable pattern APT selected by the second operation section 112 in the timetable TB may be referred to as "timetable update processing". Also, the processing of updating each unplaced pattern NPT in response to placement of the succeedingly placeable pattern APT in the timetable TB may be referred to below as "unplaced pattern update processing".

The first operation section 111 and the second operation section 112 repeat the "succeedingly placeable pattern acquisition processing", the "succeedingly placeable pattern selection processing", the "timetable update processing", and the "unplaced pattern update processing" until all the unplaced patterns NPT are placed in the timetable TB.

Once all the unplaced patterns NPT are placed in the timetable TB, the first operation section 111 calculates an evaluation value based on a reward. The learning step for one time ends then. Note that the first operation section 111 returns the timetable TB and the unplaced patterns NPT to their initial states once the learning step for one time ends.

In the present embodiment, the reward includes an intermediate reward and a final reward. Each time the timetable update processing is executed before all unplaced patterns NPT are placed in the timetable TB, the first operation section 111 determines whether to grant the intermediate reward based on the updated timetable TB. The first operation section 111 having determined to grant the intermediate reward acquires the intermediate reward. Also, once all unplaced patterns NPT are placed in the timetable TB, the first operation section 111 acquires the final reward based on the timetable TB in which all the unplaced patterns NPT have been placed.

The first operation section 111 stores an intermediate reward history in the storage 113 each time the intermediate reward is acquired. Here, the intermediate reward history contains information indicating a value of the intermediate reward and information indicating a pattern PT (succeedingly placeable pattern APT placed as a result of execution of the timetable update processing) that is a cause of intermediate reward acquisition.

Furthermore, each time a reward and an evaluation value are calculated, the first operation section 111 stores at least one of a reword history and an evaluation value history in the storage 113. The reward history contains information indicating a value of the reward and information indicating how many times the learning step is executed to acquire the value of the reward. Similarly, the evaluation value history contains information indicating an evaluation value and information indicating how many times the learning step is executed to quire the evaluation value. Note that the first operation section 111 generates image information indicating a learning curve based on the reward history or the evaluation value history in the present embodiment.

The storage 113 includes a main storage device. The main storage device is semiconductor memory, for example. The storage 113 further includes an auxiliary storage device. The auxiliary storage device includes at least one of semiconductor memory and a hard disk drive, for example. The storage 113 may include a removable medium.

The storage 113 stores various computer programs and various data therein. The various computer programs include a first control program executed by the first operation section 111 and a second control program executed by the second operation section 112. The various data includes setting information indicating the number of times the learning step is repeated, information indicating the timetable TB, information indicating each unplaced pattern NPT, information indicting the constraint condition, and information indicating the intermediate reward history. The various data further includes information indicating at least one of the reward history and the evaluation value history. In the following, the number of times the learning step is repeated may be referred to as "learning number".

The schedule creating device 100 will be further described next with reference to FIG. 1. As illustrated in FIG. 1, the schedule creating device 100 further includes an put section 121 and an output section 122.

The input section 121 is a user interface device that an operator operates. The input section 121 inputs to the first operation section 111 an instruction (control signal) according to an operation by the operator. The input section 121 further inputs to the first operation section 111 data according to an operation by the operator. The input section 121 typically includes a keyboard and a mouse. For example, the operator is allowed to set the learning number by operating the input section 121.

The output section 122 is an interface for connecting the schedule creating device 100 to an external display apparatus 130. The output section 122 is a USB port, a D-SUB terminal, a HDMI (registered Japanese trademark) terminal, or a display port, for example. The output section 122 outputs the image information to the display apparatus 130, Specifically, the output section 122 outputs the image information indicating a learning curve to the display apparatus 130. Note that the output section 122 may be connected wirelessly to the display apparatus 130. In this case, the output section 122 includes a communication circuit in compliance with the short-range wireless communication standard, such as BLUETOOTH (registered Japanese trademark).

The display apparatus 130 is a liquid crystal display apparatus or an electroluminescent (EL) display apparatus, for example. The display apparatus 130 displays the learning curve. As a result of the display apparatus 130 displaying the learning curve, the operator can check whether or not the evaluation value or the reward converges on a target value. In the above configuration, the operator may increase the learning number by operating the input section 121 when the evaluation value or the reward does not converge on the target value, Note that the schedule creating device 100 may include the display section.

In this case, the first operation section 111 may cause the display section to display the learning curve. In a case in which the schedule creating device 100 includes the display section, the input section 121 may include a touch sensor superimposed on the display surface of the display section. A graphical user interface may be constituted by the touch sensor being superimposed on the display surface of the display section.

Figure 2:
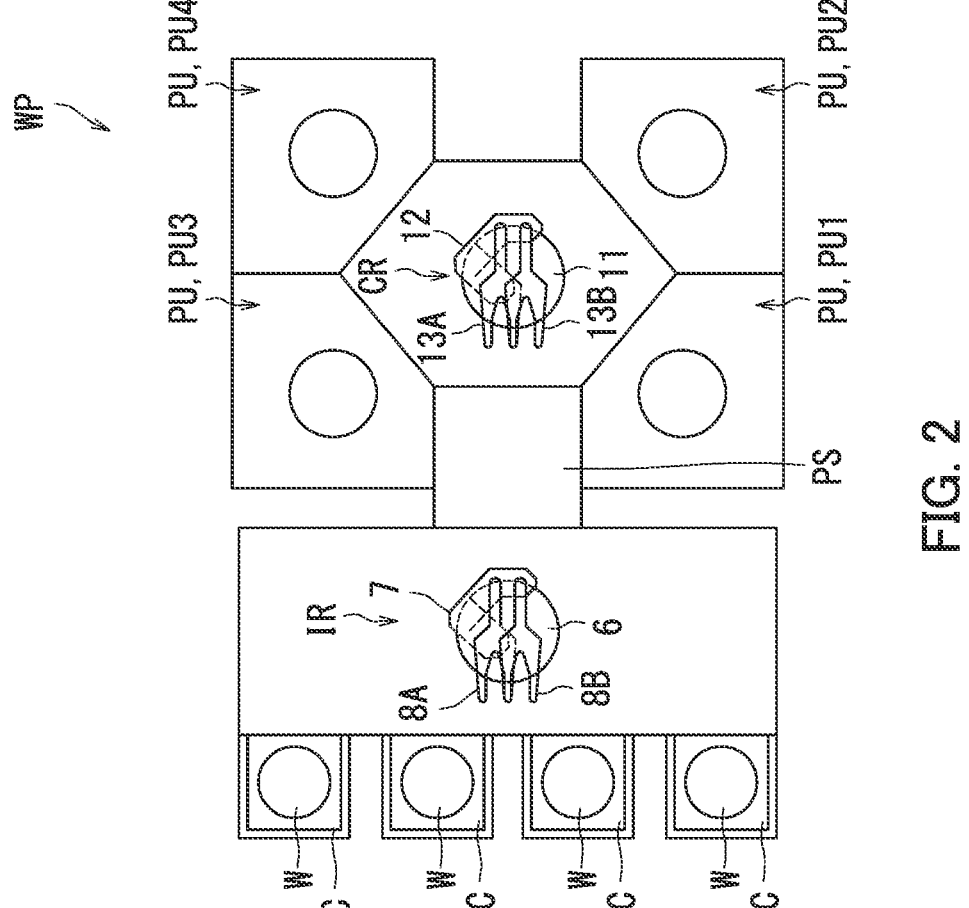
FIG. 2 is a diagram illustrating an example of the configuration of a substrate processing apparatus for which a schedule is created by the schedule creating device according to the first embodiment.
Figure 4:
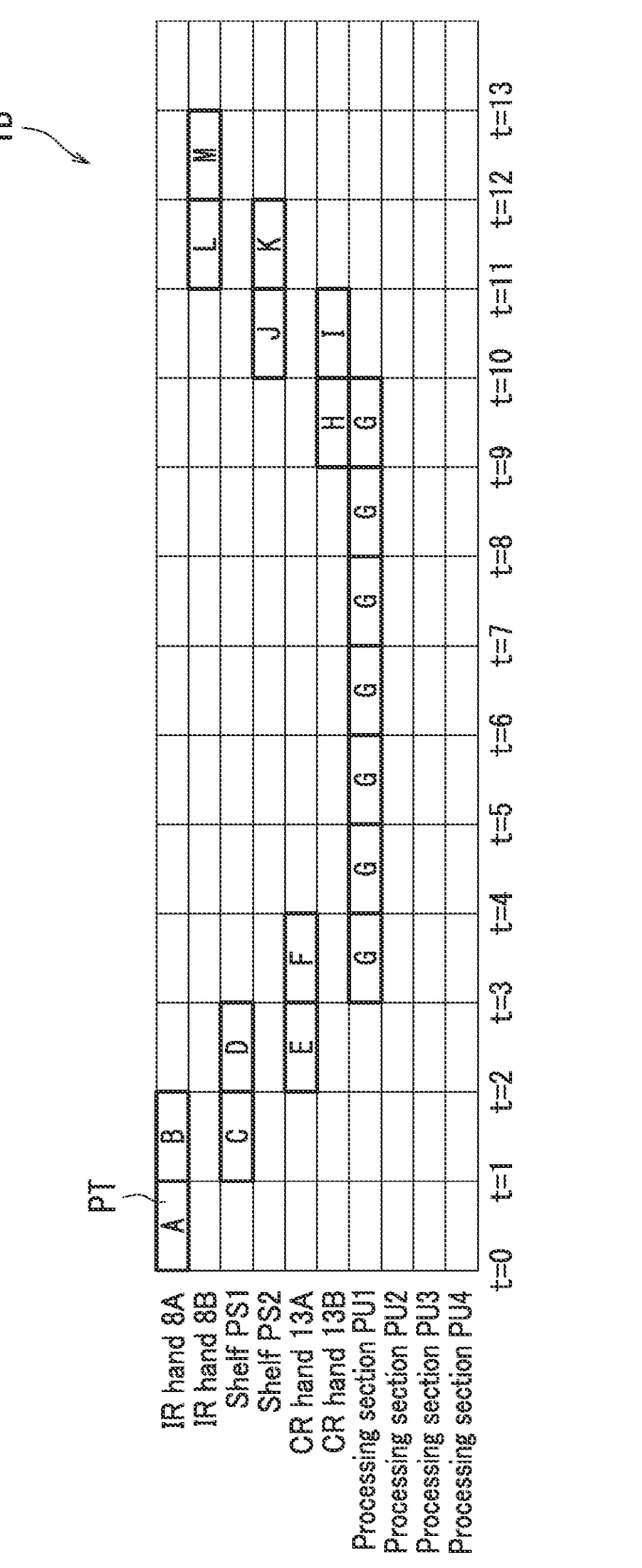
FIG. 4 is a diagram illustrating an example of a timetable.

The patterns PT and the timetable TB will be described next with reference to FIGS. 1 to 5. FIG. 2 is a diagram illustrating an example of the configuration of the substrate processing apparatus WP for which a schedule is created by the schedule creating device 100 of the present embodiment. FIG. 3 is a diagram illustrating examples of the patterns PT. FIG. 4 is a diagram illustrating an example of the timetable TB. In detail, FIG. 3 illustrates the patterns PT for the substrate processing apparatus WP illustrated in FIG. 2. FIG. 4 illustrates the timetable TB for the substrate processing apparatus WP illustrated in FIG. 2. Note that the timetable TB is an environment for the reinforcement learning in the present embodiment.

The configuration of the substrate processing apparatus WP illustrated in FIG. 2 will be described first. The substrate processing apparatus WP illustrated in FIG. 2 includes four substrate containers C, an indexer robot IR, a delivery section PS, a transport robot CR, and four processing sections PU (processing sections PU1 to PU4).

The substrate containers C each accommodate a plurality of substrates W in a stacked manner. Specifically, the substrates W are stacked in a horizontal posture at intervals in a perpendicular direction in each substrate container C. Here, the horizontal posture is a state in which the thickness direction of the substrates W follows the vertical direction. The substrate containers C may each be a front opening unified pod (FOUP), a standard mechanical interface (SMIF) pod, or an open cassette (OC).

The indexer robot IR transports a non-processed substrate W from a substrate container C to the delivery section PS and transports a processed substrate W from the delivery section PS to a substrate container C. Specifically, the indexer robot IR includes a base 6, an articulated arm 7, and two hands (hands 8A and 8B).

The base 6 supports the base end of the articulated arm 7. The base 6 includes an arm rotating mechanism and an arm raising and lowering mechanism. The arm rotating mechanism rotates the articulated arm 7 about a vertical axis thereof. The arm raising and lowering mechanism raises and lowers the articulated arm 7. As such, the articulated arm 7 is rotatable about the base 6. Furthermore, the articulated arm 7 freely ascends and descends relative to the base 6.

The articulated arm 7 freely bends and stretches in the horizontal direction. Specifically, the articulated arm 7 includes a plurality of arras, a plurality of joints, and a plurality of individual rotating mechanisms. Two of the arms are connected to each of the joints. The respective arms rotate about the joints connected thereto. The individual rotating mechanisms are provided at the respective joints and rotate the corresponding arms along a horizontal plane.

The hands 8A and 8B are supported at the tip end of the articulated arm 7. The articulated arm 7 further includes a hand rotating mechanism that rotates the hands 8A and 8B individually about the vertical axis thereof and a hand advancing and retreating mechanism that advances and retreats the hands 8A and 8B individually in a horizontal direction. As such, the hands 8A and 8B are individually rotatable about the articulated arm 7. Also, the hands 8A and 8B are capable of individually advancing and retreating relative to the articulated arm 7.

The hands 8A and 8B each grip one substrate W. Note that the hands 8A and 8B may be arranged in a superposed manner in the vertical direction but are shifted from each other in a direction (horizontal direction) parallel to the drawing surface of FIG. 2 for the sake of clarity.

The delivery section PS includes a plurality of shelves that support substrates W. The delivery section PS includes at least one shelf for supporting a non-processed substrate W and at least one shelf for supporting a processed substrate W. In the present embodiment, the delivery section PS includes one shelf for supporting a non-processed substrate W and one shelf for supporting a processed substrate W. In the following, the shelf for supporting a non-processed substrate W may be referred to as "shelf PS1" while the shelf for supporting a processed substrate W may be referred to as "shelf PS2".

The transport robot CR transports a non-processed substrate W from the delivery section PS to a processing section PU and transports a processed substrate W from the processing section PU to the delivery section PS. Specifically, the transport robot CR includes a base 11, an articulated arm 12, and two hands (hands 13A and 13B).

The base 11 supports the base end of the articulated arm 12. The base 11 includes an arm rotating mechanism and an arm raising and lowering mechanism. The arm rotating mechanism rotates the articulated arm 12 about a vertical axis thereof. The arm raising and lowering mechanism raises and lowers the articulated arm 12. As such, the articulated arm 12 is rotatable about the base 11. Furthermore, the articulated arm 12 is capable of freely ascending and descending relative to the base 11.

The articulated arm 12 freely bends and stretches in the horizontal direction. Specifically, the articulated arm 12 includes a plurality of arms, a plurality of joints, and a plurality of individual rotating mechanisms. Two of the arms are connected to each of the joints. The respective arms rotate about the joints connected thereto The individual rotating mechanisms are provided at the respective joints and rotate the corresponding arms along a horizontal plane.

The hands 13A and 13B are supported at the tip end of the articulated arm 12. The articulated arm 12 further includes a hand rotating mechanism that rotates the hands 13A and 13B individually about the vertical axis thereof and a hand advancing and retreating mechanism that advances and retreats the hands 13A and 13B individually in the horizontal direction. As such, the hands 13A and 138B are individually rotatable about the articulated arm 12. Also, the hands 13A and 138B are capable of individually advancing and retreating relative to the articulated arm 12.

The hands 13A and 13B each grip one substrate W. Note that the hands 13A and 13B may be arranged in a superposed manner in the vertical direction but are shifted from each other in a direction (horizontal direction) parallel to the drawing surface of FIG. 2 for the sake of clarity.

Each of the processing sections PU processes the substrates W one at a time. For example, each processing section PU performs on a substrate W any of the chemical liquid cleaning, the brush cleaning, the etching, the photosensitive mask application, the development, the annealing, and the plotting.

The patterns PT corresponding to the configuration of the substrate processing apparatus WP illustrated in FIG. 2 will be described next with reference to FIG. 3. As illustrated in FIG. 3, the patterns PT corresponding to the configuration of the substrate processing apparatus WP illustrated in FIG. 2 include 13 patterns A to M.

The pattern A indicates a procedure of bringing a non-processed substrate W out of a substrate container C by the indexer robot IR. The pattern B indicates a procedure of transporting the non-processed substrate W to the delivery section PS and bringing the non-processed substrate W into the delivery section PS by the indexer robot IR. The pattern C indicates a procedure of bringing the non-processed substrate W into the delivery section PS. The pattern D indicates a procedure of bringing the non-processed substrate W out of the delivery section PS. The pattern E indicates a procedure of bringing the non-processed substrate W out of the delivery section PS by the transport robot CR. The pattern F indicates a procedure of transporting the non-processed substrate W to a processing section PU and bringing the non-processed substrate W into the processing section PU by the transport robot CR. The pattern G indicates a procedure of bringing the non-processed substrates W into a processing section PU, processing the non-processed substrate W by the processing section PU, and bringing a processed substrate W, which is the non-processed substrate W subjected to substrate processing, out of the processing section PU. The pattern H indicates a procedure of bringing the processed substrate W out of the processing section PU by the transport robot CR. The pattern I indicates a procedure of transporting the processed substrate W to the delivery section PS and bringing the processed substrate W into the delivery section PS by the transport robot CR. The pattern J indicates a procedure of bringing the processed substrate W into the delivery section PS. The pattern K indicates a procedure of bringing the processed substrate W out of the delivery section PS. The pattern L indicates a procedure of bringing the processed substrate W out of the delivery section PS by the indexer robot IR. The pattern M indicates a procedure of transporting the processed substrate W to a substrate container C and bringing the processed substrate W into a substrate container C by the indexer robot IR.

The constraint condition of the substrate processing apparatus WP illustrated in FIG. 2 will be described next. The constraint condition of the substrate processing apparatus WP illustrated in FIG. 2 includes constraint conditions 1 to 9 shown below in Table 3.

TABLE 3

| Constraint condition | Details of constraint condition |
|---|---|
| Constraint condition 1 | Processing proceeds in the order of the processing sequence. |
| Constraint condition 2 | The hand 8A of the indexer robot IR transports non-processed substrates W one at a time. |
| Constraint condition 3 | The hand 8B of the indexer robot IR transports processed substrates W one at time. |
| Constraint condition 4 | The shelf PS1 of the delivery section PS supports one non-processed substrate W. |
| Constraint condition 5 | The shelf PS2 of the delivery section PS supports one processed substrate W. |
| Constraint condition 6 | The hand 13A of the transport robot CR transports non-processed substrates W one at a time. |
| Constraint condition 7 | The hand 13B of the transport robot CR transports processed substrates W one at a time. |
| Constraint condition 8 | Each processing section PU processes substrates W one at a time. |
| Constraint condition 9 | The patterns PT are placed on a block-by-block basis. |

Blocks BL constraint condition 9) will be described next. The blocks BL each indicate patterns PT successively placed in the timetable TB. The patterns PT are divided in blocks. As a result of placement of the patterns PT in blocks, a physically disabled act in the substrate processing apparatus WP can be prohibited. For example, the patterns A to M of the substrate processing apparatus WP illustrated in FIG. 2 are divided into blocks BL1 to BL7 as illustrated in FIG. 3.

The timetable TB will be described next with reference to FIGS. 1 to 4. As illustrated in FIG. 4, the timetable TB defines a time schedule for each element of the substrate processing apparatus WP. Specifically, the horizontal axis of the timetable TB indicates time. In the timetable TB, patterns PT corresponding to the respective elements of the substrate processing apparatus WP are placed along the time axis of the timetable TB. In the timetable TB illustrated in FIG. 4, the patterns A to M illustrated in FIG. 3 are placed based on the constraint conditions 1 to 9 (Table 3). The timetable TB is a Gantt chart, for example. Note that the patterns PT placed in the timetable TB may be numeric information or image information.

Here, the processing of placing the patterns PT in the timetable TP by the first operation section 111 will be further described with reference to FIGS. 1 to 4. In the present embodiment, the first operation section 111 calculates a placeable time TA for the succeedingly placeable pattern APT based on the constraint condition. The placeable time TA corresponds to a time indicated by the timetable TB. In detail, the placeable time TA indicates a time on the timetable TB at which processing for the succeedingly placeable pattern APT is allowed to start. In the example illustrated in FIGS. 3 and 4, the first operation section 111 calculates a placeable time TA as illustrated in FIG. 3. As illustrated in FIG. 4, the first operation section 111 places the pattern PT selected by the second operation section 112 in the timetable TB according to the placeable time TA.

Figure 5:
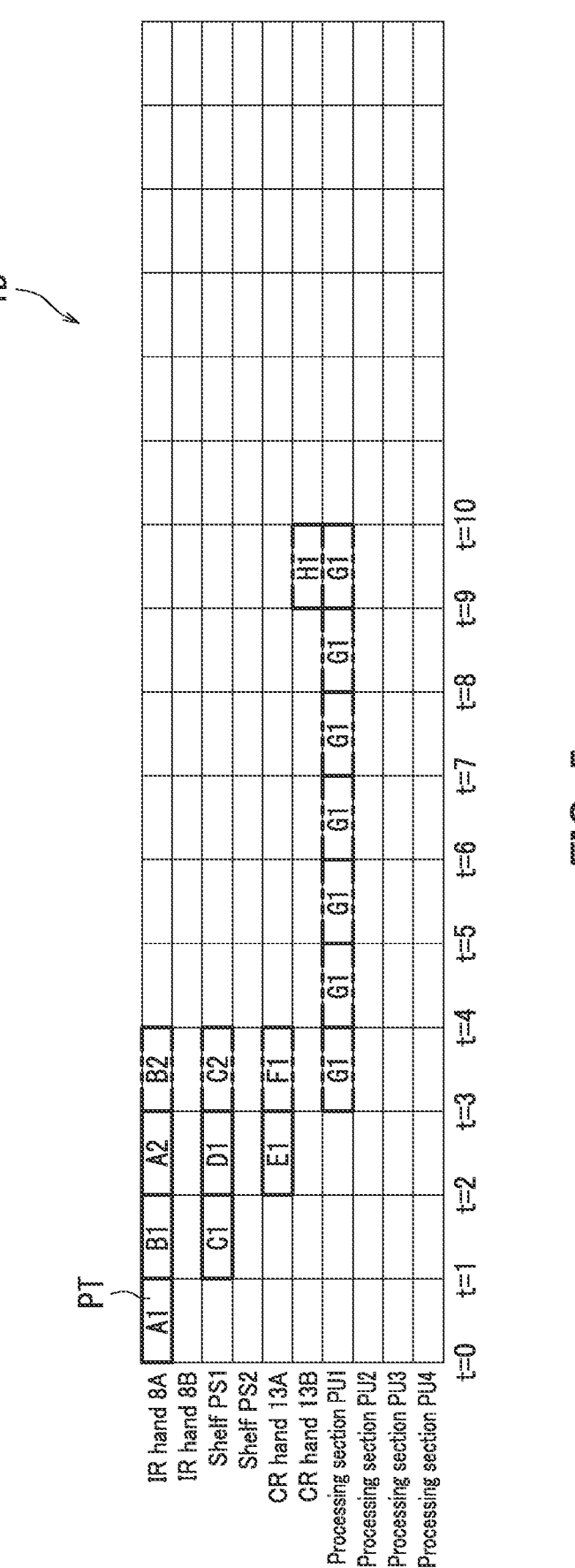
FIG. 5 is a diagram illustrating a timetable in the process of time schedule creation in a case in which the substrate processing apparatus illustrated in FIG. 2 performs processing on two substrates.

The constraint condition 9 described in Table 3 will be described next with reference to FIGS. 1 to 5. FIG. 5 is a diagram illustrating a timetable TB in the process of time schedule creation in a case in which the substrate processing apparatus WP illustrated in FIG. 2 processes two substrates W1 and W2.

In the timetable TB illustrated in FIG. 5, the succeedingly placeable patterns APT after the pattern E (pattern E1) for the substrate W1 is placed are the pattern F (pattern F1) for the substrate W1 and the pattern B (pattern B2) for the substrate W2.

The patterns F to H constitute one block BL (block BL4) as illustrated in FIG. 3. Therefore, when the second operation section 112 selects the pattern F (pattern F1) for the substrate W1 at that time point, the first operation section 111 having placed the pattern F (pattern F1) for the substrate W1 in the timetable TB acquires only the pattern G (pattern G1) for the substrate W1 as a succeedingly placeable pattern APT. As a result, the pattern G (pattern G1) for the substrate W1 is placed in the timetable TB. Next, the first operation section 111 acquires only the pattern H (pattern H1) for the substrate W1 as a succeedingly placeable pattern APT. As a result, the pattern H (pattern H1) for the substrate W1 is placed in the timetable TB.

Alternatively, when the second operation section 112 selects the pattern B (pattern B2) for the substrate W2, which constitutes one block BL (block BL2) together with the pattern C as illustrated in FIG. 3, the first operation section 111 places the pattern B (pattern B2) for the substrate W1 in the timetable TB and acquires only the pattern C (pattern C2) for the substrate W2 as a succeedingly placeable pattern APT. As a result, the pattern C (pattern C2) for the substrate W2 is placed in the timetable TB.

As has been described so far with reference to FIGS. 1 to 5, when the pattern F is placed in the timetable TB, the patterns F, G, and H included in the block BL4 are successively placed in the timetable TB. Also, when the pattern B is placed in the timetable TB, the patterns B and C included in the block BL2 are successively placed in the timetable TB. That is, the patterns PT are placed in the timetable TB in block units. As a result of placement of the patterns PT in the timetable TB in block units in the manner described above, efficiency of processing of time schedule creation can be increased.

Figure 6:
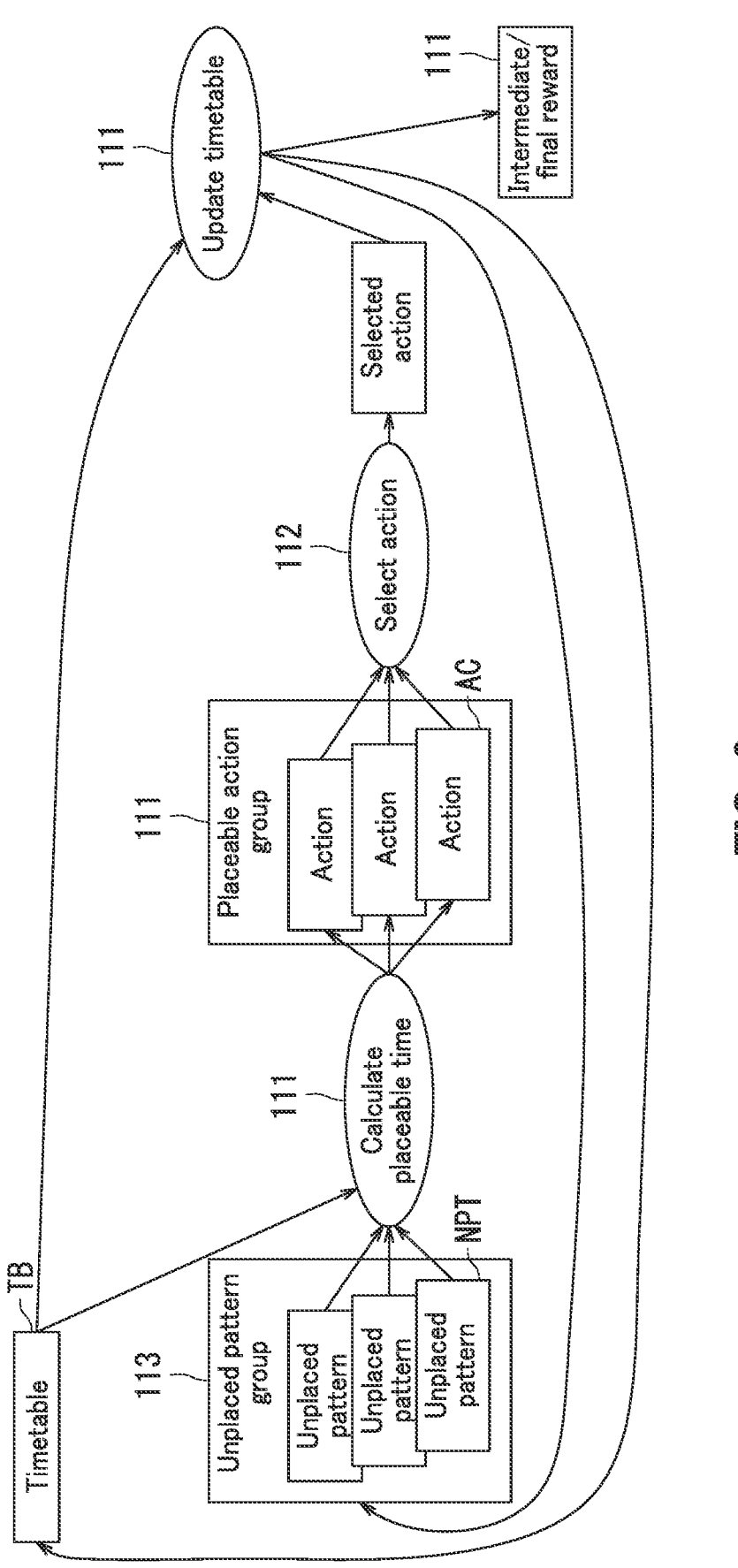
FIG. 6 is a sequence diagram depicting an example of a flow of a learning step executed by the schedule creating device according to the first embodiment.

The schedule creating device 100 of the present embodiment will be described next with reference to FIGS. 1, 6, and 7. FIG. 6 is a sequence diagram depicting an example of a flow of the learning step executed by the schedule creating device 100 of the first embodiment.

As illustrated in FIG. 6, the first operation section 111 calculates a placeable time TA for each unplaced pattern NPT based on the prescribed constraint condition and the timetable TB at the current stage and each unplaced pattern NPT at the current stage each stored in the storage 113. In detail, the first operation section 111 calculates placeable times TA that reflects the constraint condition in the process of calculation of the placeable times TA for the respective unplaced patterns NPT. As such, only one or more placeable times TA for unplaced patterns NPT (succeedingly placeable patterns APT) that is allowed to be placed next are calculated.

After calculating the placeable time TA for the succeedingly placeable pattern APT, the first operation section 111 generates actions AC used for reinforcement learning based on the succeedingly placeable pattern APT and the placeable time TA for the succeedingly placeable pattern APT. The actions AC each are an operation of placing a succeedingly placeable pattern APT according to a placeable time TA in the timetable TB.

The first operation section 111 inputs the generated actions AC to the second operation section 112. More specifically, the actions AC, the timetable TB at the current stage, and each unplaced pattern NPT at the current stage are input to the second operation section 112 by the first operation section 111.

The second operation section 112 predicts and selects an action AC that makes the evaluation value maximum based on the actions AC, the timetable TB at the current stage, and each unplaced pattern NPT at the current stage each input from the first operation section 111.

The first operation section 111 updates the timetable TB by placing in the timetable TB a pattern PT (succeedingly placeable pattern APT) corresponding to the action AC selected by the second operation section 112, and updates the unplaced patterns NPT. Furthermore, the first operation section 111 acquires an intermediate reward or a final reward based on the updated timetable TB.

Description will be made next of a network structure NW for the reinforcement learning with reference to FIG. 7. FIG. 7 is a diagram illustrating the network structure NW for the reinforcement learning. The network structure NW illustrated in FIG. 7 may be constituted by a program used for the reinforcement learning described with reference to FIG. 1.

Figure 7:
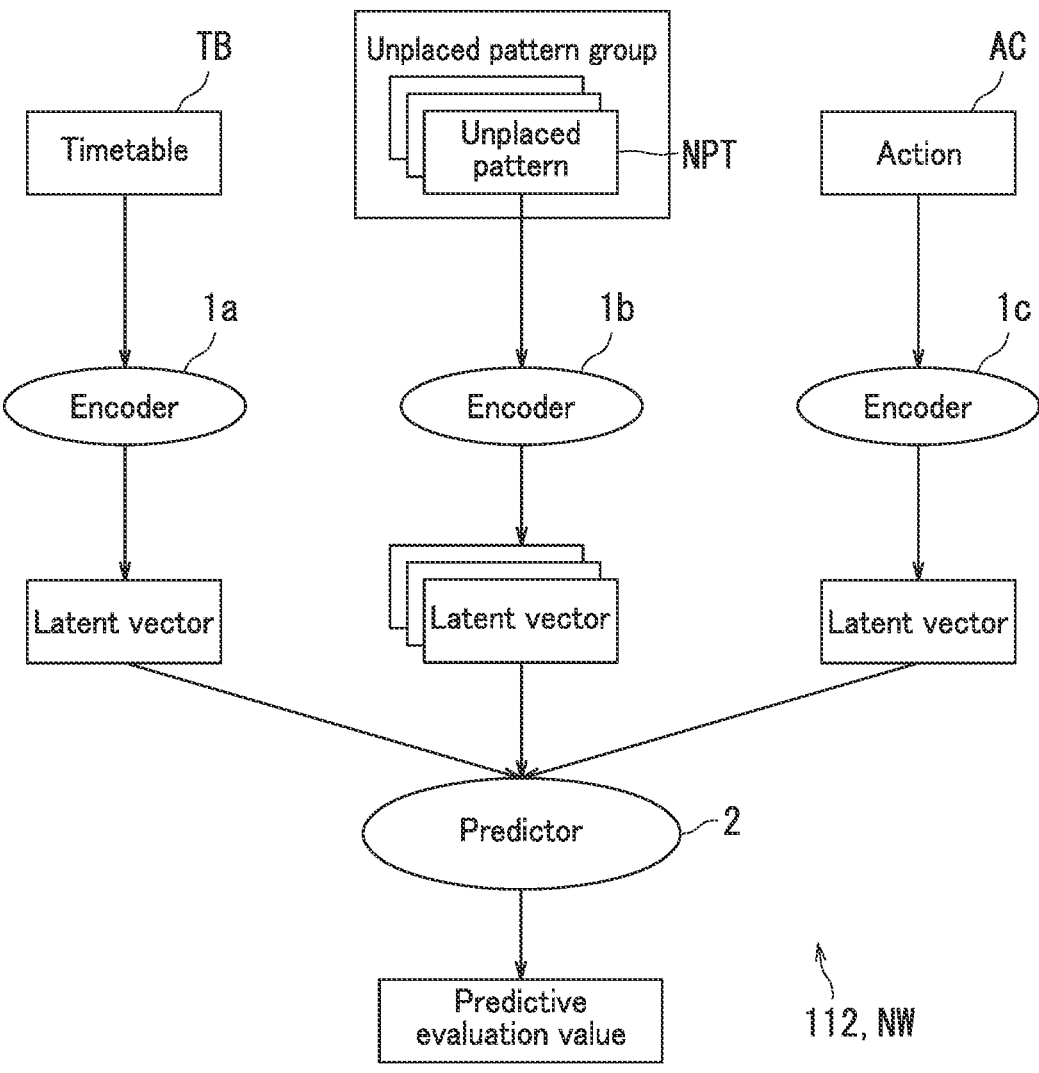
FIG. 7 is a diagram illustrating a network structure for the reinforcement learning.

As illustrated in FIG. 7, the network structure NW includes first to third encoders 1a to 1c and a predictor 2. The first encoder 1a converts the timetable TB at the current stage to a latent vector and inputs the latent vector to the predictor 2. The second encoder 1b converts each unplaced pattern NPT at the current stage to a latent vector and inputs the latent vector to the predictor 2. The third encoder 1c converts the actions AC generated by the first operation section 111 to latent vectors and inputs the latent vectors to the predictor 2.

The predictor 2 includes the predictive model described with reference to FIG. 1. The predictor 2 may include a neural network as the predictive mode 1 as described with reference to FIG. 1. The predictor 2 calculates a predictive evaluation value for each action AC based on the latent vector indicating the timetable TB at the current stage, each latent vector indicating an unplaced pattern NPT at the current stage, and the latent vectors indicating the actions AC generated by the first operation section 111. In detail, the latent vector indicating the timetable TB at the current stage, the latent vector indicating the unplaced pattern NPT at the current stage, and the latent vectors indicating the actions AC generated by the first operation section 111 are input to the input layer of the predictive model (neural network). As a result, a predictive evaluation value is output from the output layer of the predictive model (neural network). The second operation section 112 selects one of the actions AC based on the predictive evaluation value.

A schedule creating method of the present embodiment will be described next with reference to FIGS. 1 to 17. The schedule creation method of the present embodiment is implemented by the schedule creating device 100 described with reference to FIGS. 1 to 7.

Figure 8:
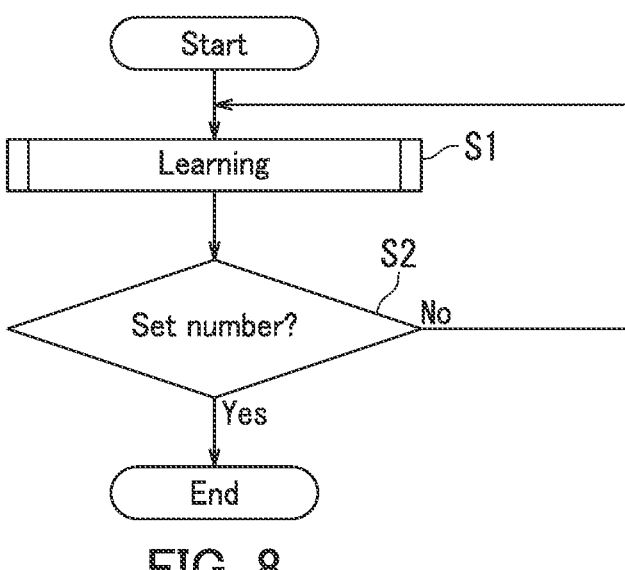
FIG. 8 is a flowchart depicting a flow of processing by a first operation section and a second operation section included in the schedule creating device according to the first embodiment.

FIG. 8 is a diagram depicting the schedule creation method of the present embodiment. In detail, FIG. 8 is a flowchart depicting a flow of processing by the first operation section 111 and the second operation section 112 included in the schedule creating device 100 of the present embodiment. The processing depicted in FIG. 8 starts in response to the operator operating the input section 121 to instruct a start of the reinforcement learning.

As depicted FIG. 8, once the reinforcement learning starts, the first operation section 111 and the second operation section 112 execute the learning step (Step S1). After the learning step is completed, the first operation section 111 determines whether or not the learning number has reached a set number (Step S2).

If the first operation section 111 determines that the learning number has reached the set number (Yes in Step S2), the processing (reinforcement learning) depicted in FIG. 8 ends. If the first operation section 111 determines that the learning number has not reached the set number (No in Step S2), the first operation section 111 and the second operation section 112 re-execute the learning step (Step S1). As such, the first operation section 111 and the second operation section 112 repeat the learning step until the learning number reaches the set number.

Figure 9:
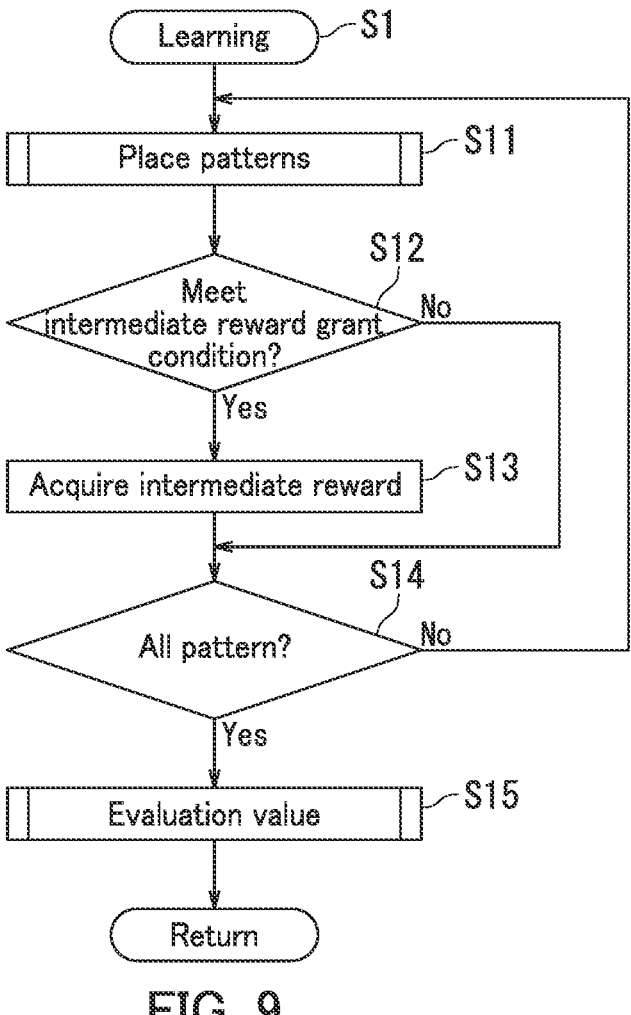
FIG. 9 is a flowchart depicting a processing flow of the learning step.

The learning step (Step S1) will be described next with reference to FIG. 9. FIG. 9 is a flowchart depicting a processing flow of the learning step. As depicted in FIG. 9, the learning step includes Steps S11 to S15.

Once the learning step starts, the first operation section 111 and the second operation section 112 place one of the patterns PT in the timetable TB (Step S11). As a result, the timetable TB is updated.

When one of the patterns PT is placed in the timetable TB, the first operation section 111 determines whether or not the pattern PT placed the latest in the timetable TB meets a prescribed intermediate reward grant condition (Step S12). Note that the intermediate reward grant condition is pre-stored in the storage 113, The intermediate reward grant condition is determined based on the apparatus configuration of the substrate processing apparatus WP.

If it is determined that the pattern PT placed the latest in the timetable TB meets the prescribed intermediate reward grant condition (Yes in Step S12), the first operation section 111 acquires an intermediate reward based on the updated timetable TB (Step S13).

If it is determined that the pattern PT placed the latest in the timetable TB does not meet the prescribed intermediate reward grant condition (No in Step S12), the first operation section 111 determines whether or not all patterns PT have been placed in the timetable TB (Step S14). Alternatively, the first operation section 111 having acquired the intermediate reward determines whether or not all patterns PT have been placed in the timetable TB (Step S14).

If the first operation section 111 determines that not all the patterns TP have been placed in the timetable TB (No in Step S14), the processing returns to Step S11. As such, Steps S11 to S14 are repeated until all the patterns PT have been placed in the timetable TB.

If it is determined that all the patterns PT have been placed in the timetable TB (Yes in Step S14), the first operation section 111 calculates an evaluation value (Step S15). The learning step ends then.

A reward (intermediate reward) corresponding to the state of the timetable TB in progress can be acquired in addition to the reward (final reward) corresponding to the final state of the timetable TB in the present embodiment. This can achieve creation of a time schedule that enables further efficient processing on the substrates W.

Three examples of the intermediate reward grant condition (first to third intermediate reward grant conditions) will be described here. In the following, a pattern PT placed the latest in the timetable TB may be referred to as "latest placed pattern PT". Also, at least one pattern PT placed in the timetable TB directly before update may be referred to as "pre-update pattern PT".

The first intermediate reward grant condition will be described first. In a case in which the transport robot CR of the substrate processing apparatus WP is capable of transporting a plurality of substrates W simultaneously, the intermediate reward grant condition may include the first intermediate reward grant condition. In a case for example in which the transport robot CR includes four hands, the transport robot CR is capable of transporting two substrates W simultaneously. The first intermediate reward grant condition indicates simultaneous transport of mutually different substrates W by the transport robot CR. When a combination of the latest placed pattern PT and the pre-update pattern PT indicates simultaneous transport of substrates W by the transport robot CR, the latest placed pattern PT meets the first intermediate reward grant condition.

The first operation section 111 acquires a first intermediate reward when the latest placed pattern PT meets the first intermediate reward grant condition. The first intermediate reward is an intermediate reward corresponding to the first intermediate reward grant condition. The value of the first intermediate reward is pre-stored in the storage 113. The first intermediate reward is a positive (plus) reward. With the first intermediate reward grant condition, a reward (intermediate reward) can be granted to a time schedule that can exert a function unique to the apparatus configuration of the substrate processing apparatus WP, thereby achieving creation of a time schedule according to which the substrates W can be processed further efficiently.

The second intermediate reward grant condition will be described next. In a case in which the substrate processing apparatus WP includes a processing section PU, the intermediate reward grant condition may include the second intermediate reward grant condition. The second intermediate reward grant condition indicates bringing of a substrate W into the processing section PU directly after bringing of another substrate W out of the processing section PU. In other words, the second intermediate reward grant condition indicates replacement of substrates W in the processing section PU. When a combination of the latest placed pattern PT and the pre-update patterns PT indicates replacement of the substrates W in the processing section PU, the latest placed pattern PT meets the second intermediate reward grant condition.

The first operation section 111 acquires a second intermediate reward when the latest placed pattern PT meets the second intermediate reward grant condition. The second intermediate reward is an intermediate reward corresponding to the second intermediate reward grant condition. The value of the second intermediate reward is pre-stored in the storage 113. The second intermediate reward is a positive (plus) reward. The value of the second intermediate reward may be the same as or different from the value of the first intermediate reward. With the second intermediate reward grant condition, a time schedule according to which the processing section PU operates continuously can be created. As a result, a time schedule according to which the substrates W can be processed further efficiently can be created.

The third intermediate reward grant condition will be described next. The intermediate reward grant condition may include the third intermediate reward grant condition. The third intermediate reward grant condition indicates placement of a first pattern PT1 in the timetable TB after placement of a second pattern PT2 in the timetable TB when the placeable time TA of the first pattern PT1 is earlier than the placeable time TA of the second pattern PT2. As such, when the first pattern PT1 (latest placed pattern PT) is placed in the timetable TB after the second pattern PT2 is placed in the timetable TB, the latest placed pattern PT meets the third intermediate reward grant condition.

The first operation section 111 acquires the third intermediate reward when the latest placed pattern PT meets the third intermediate reward grant condition. The third intermediate reward is an intermediate reward corresponding to the third intermediate reward grant condition. The value of the third intermediate reward is pre-stored in the storage 113. The third intermediate reward is a negative (minus) reward. With the third intermediate reward grant condition, a possibility that a time schedule according to which substrates W can be processed not so efficiently is created can be reduced.

Figure 10:
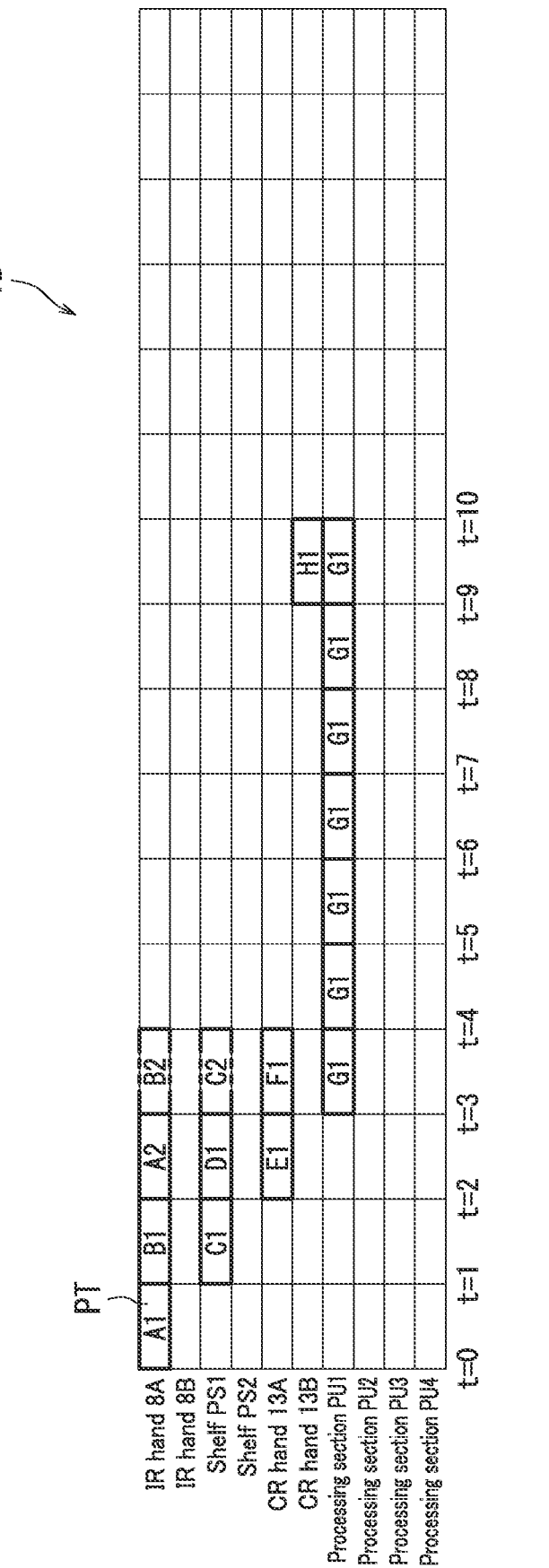
FIG. 10 is a diagram illustrating another example of the timetable in the process of time schedule creation in a case in which the substrate processing apparatus illustrated in FIG. 2 performs processing on two substrates.

One example of the third intermediate reward grant condition will be described next with reference to FIG. 10. FIG. 10 is a diagram illustrating another example of the timetable TB in the process of time schedule creation in a case in which the substrate processing apparatus WP illustrated in FIG. 2 processes two substrates W1 and W2. In the example illustrated in FIG. 10, a placeable time TA (t=3) of the pattern B (pattern B2) for the substrate W2 is earlier than a placeable time TA=9) of the pattern H (pattern. H1) for the substrate W1. In the example illustrated in FIG. 10, the pattern B2 is placed after the pattern H1 is placed. Accordingly, when the timetable TB is updated by placing the pattern B2 in the timetable TB, the first operation section 111 acquires the third intermediate reward.

Figure 11:
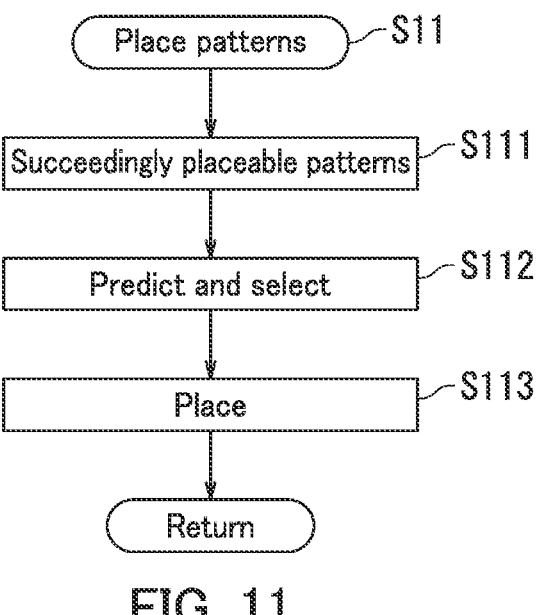
FIG. 11 is a flowchart depicting a processing flow of pattern placement in the timetable.

Processing (step S11) of placing a pattern PT in the timetable TB will be described next with reference to FIG. 11. FIG. 11 is a flowchart depicting a flow of the processing of placing a pattern PT in the timetable TB. As depicted in FIG. 11, the processing of placing a pattern PT in the timetable TB includes Steps S111 to S113.

Once the processing of placing a pattern PT in the timetable TB starts, the first operation section 111 acquires succeedingly placeable patterns APT from among the unplaced patterns NPT based on the prescribed constraint condition (Step S111). The constraint condition may include the first constraint condition and the second constraint condition, for example. The first constraint condition is a condition for acquiring a pattern of the patterns PT that is allowed to be placed next in the order of the processing sequence. The second constraint condition is a condition for prohibiting execution of operation that the substrate processing apparatus WP is physically disabled to perform. With the first constraint condition, it can be ensured that a time schedule according to which the substrate processing apparatus WP operates in the order of the processing sequence is created. With the second constraint condition, a time schedule including an operation disabled to be physically performed can be inhibited from being created.

When the first operation section 111 acquires the succeedingly placeable patterns APT, the second operation section 112 predicts and selects a pattern that makes the evaluation value maximum from among the succeedingly placeable patterns APT.

When the second operation section 112 selects a succeedingly placeable pattern APT, the first operation section 111 places the succeedingly placeable pattern APT selected by the second operation section 112 in the timetable TB to update the timetable TB (Step S113). The processing depicted in FIG. 11 ends then.

Figure 12:
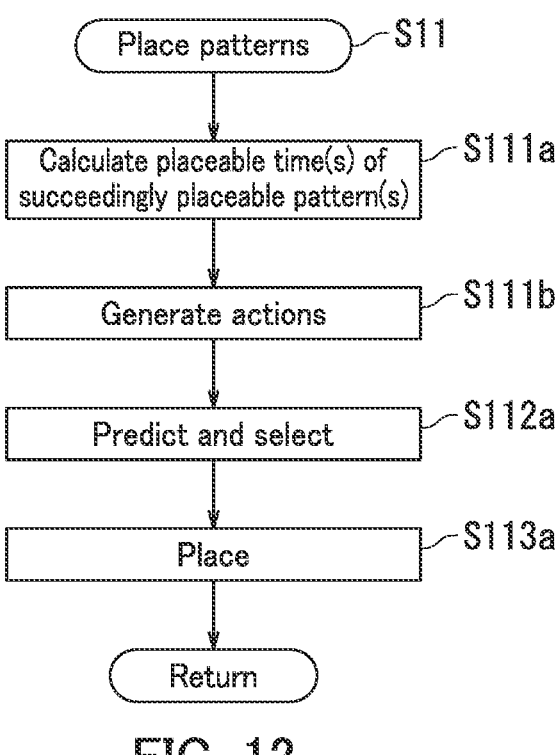
FIG. 12 is a flowchart de an example of processing flow of pattern placement in the timetable.

An example of the processing (step S11) of placing a pattern PT in the timetable TB will be described next with reference to FIG. 12, FIG. 12 is a flowchart depicting an example of a flow of the processing of placing a pattern PT in the timetable TB. The processing depicted in FIG. 12 includes Steps S111a to S113a.

As depicted in FIG. 12, once the processing of placing a pattern PT in the timetable TB starts, the first operation section 111 calculates a placeable time TA of the succeedingly placeable pattern APT based on the prescribed constraint condition (Step S111a).

The first operation section 111 having calculated the placeable time TA of the succeedingly placeable pattern APT generates actions AC used for the reinforcement learning based on the succeedingly placeable pattern APT and the placeable time TA of the succeedingly placeable pattern APT, and inputs the generated actions AC to the second operation section 112 (Step S111b). More specifically, the actions AC, the timetable TB at the current stage, and each unplaced pattern NPT at the current stage are input to the second operation section 112 by the first operation section 111.

When information indicating the timetable TB at the current stage, information indicating each unplaced pattern NPT at the current stage, and each action AC are input from the first operation section 111, the second operation section 112 predicts and selects an action AC that makes the evaluation value maximum from among the actions AC (Step S112a).

When the second operation section 112 selects the action AC, the first operation section 111 places a succeedingly placeable pattern APT, which corresponds to the action AC selected by the second operation section 112, in the timetable TB according to the placeable time TA to update the timetable TB (Step S113a). The processing depicted in FIG. 12 ends then.

Figure 13:
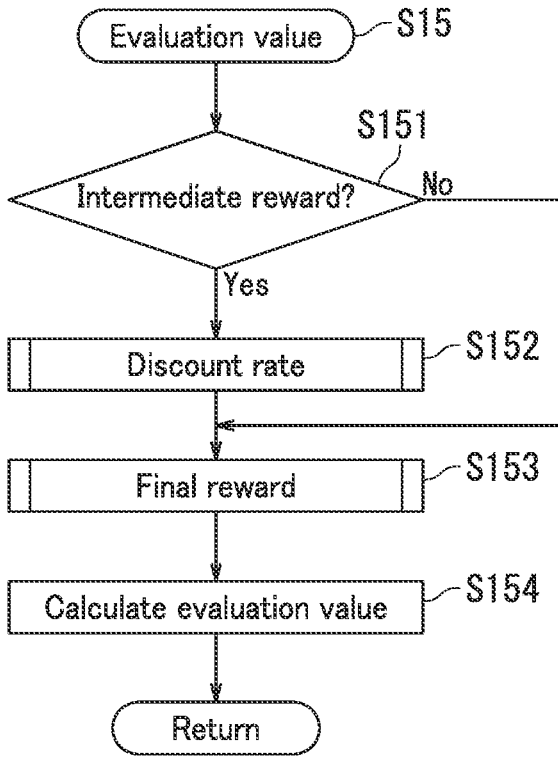
FIG. 13 is a flowchart depicting a processing flow of evaluation value calculation.

Processing of evaluation value calculation (Step S15) will be descried next with reference to FIG. 13. FIG. 13 is a flowchart depicting a flow of the processing of evaluation value calculation. As depicted in FIG. 13, the processing of evaluation value calculation includes Steps S151 to S154.

Once the processing of evaluation value calculation starts, the first operation section 111 determines whether or not an intermediate reward is granted to the timetable TB in which all the patterns PT have been placed (Step S151). In detail, the first operation section 111 determines whether or not an intermediate reward history has been stored in the storage 113.

If it is determined that the intermediate reward has been granted (Yes in Step S151), the first operation section 111 executes discount rate allocation processing (Step S152). In detail, the first operation section 111 determines whether or not to allocate a discount rate to the intermediate reward. If the first operation section 111 determines to allocate the discount rate to the intermediate reward, the first operation section 111 allocates the discount rate to the intermediate reward. As a result, the value of the intermediate reward is reduced according to the discount rate and the first operation section 111 acquires the discounted intermediate reward. If the first operation section 111 determines not to allocate the discount rate to the intermediate reward by contrast, the value of the intermediate reward remains the same.

If it is determined that the intermediate reward has not been granted (No in step S151), the first operation section 111 acquires a final reward (Step S153), Alternatively, the first operation section 111 acquires a final reward after execution of the discount rate allocation processing (Step S153).

The first operation section 111 having acquired the final reward calculates an evaluation value (Step S154). The processing depicted in FIG. 13 ends then. In detail, if the intermediate reward has been granted to the timetable TB in which all the patterns PT have been placed, the first operation section 111 calculates an evaluation value based on the intermediate reward and the final reward. If the intermediate reward has not been granted to the timetable TB in which all the patterns PT have been placed, the first operation section 111 calculates an evaluation value based on the final reward.

Figure 14:
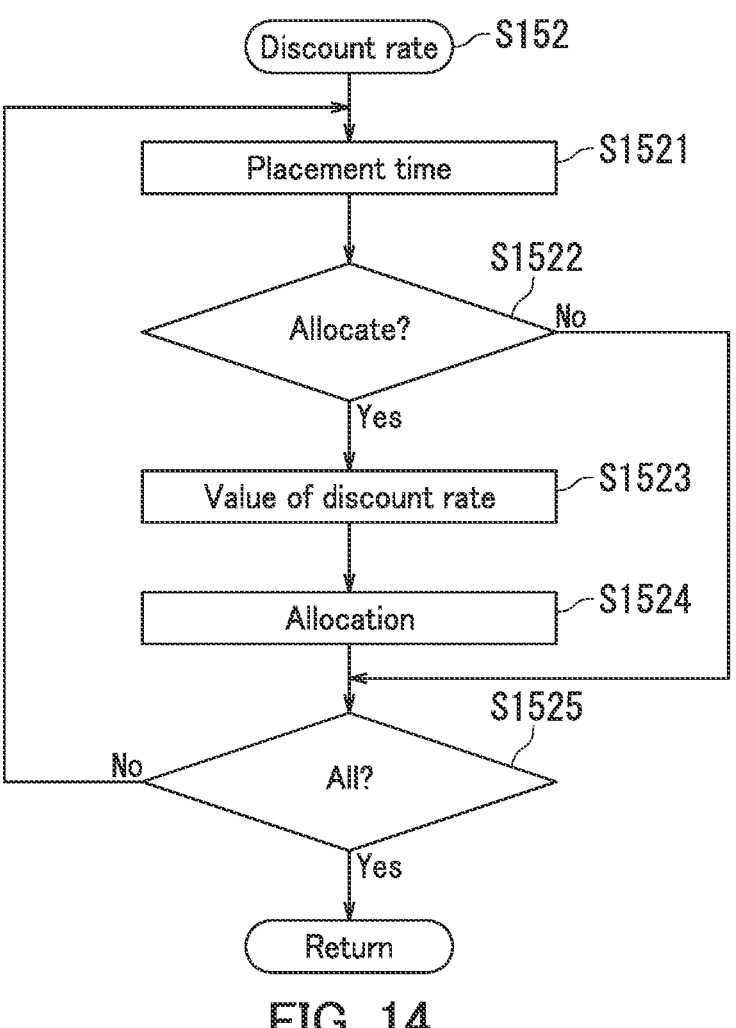
FIG. 14 is a flowchart depicting a processing flow of discount rate allocation.

The discount rate allocation processing (Step S152) will be descried next with reference to FIG. 14. FIG. 14 is a flowchart depicting a flow of the discount rate allocation processing. As depicted in FIG. 14, the discount rate allocation processing includes Steps S1521 to S1525. Note that the discount rate allocation processing is executed on a positive intermediate reward. As such, the discount rate is not applied to a negative intermediate reward and the value of the negative intermediate reward remains the same.

Once the discount rate allocation processing starts, the first operation section 111 acquires a time (placement time), of times indicated by the timetable TB, corresponding to the position of a pattern PT (position where the patterns PT are placed) that meets the intermediate reward grant condition (Step S1521). In the following, a pattern that meets the intermediate reward grant condition may be referred to as "condition meeting pattern CPT".

The first operation section 111 having acquired the placement time determines whether or not to allocate the discount rate to the intermediate reward based on the acquired placement time (Step S1522). Specifically, the first operation section 111 determines whether or not the acquired placement time matches a time (time on the timetable TB) at which the condition meeting pattern CPT is allowed to appear the earliest. In the following, the time at which the condition meeting pattern CPT is allowed to appear the earliest may be referred to as "target time". The target time is pre-stored in the storage 113.

If it is determined that the acquired placement time does not match the target time, the first operation section 111 determines to allocate the discount rate to the intermediate reward (Yes in Step S1522) The first operation section 111 having determined to allocate the discount rate to the intermediate reward calculates a value of the discount rate according to the acquired placement time (Step S1523). Specifically, the later the acquired placement time is relative to the target time, the larger the first operation section 111 makes the discount rate.

The first operation section 111 having calculated the value of the discount rate allocates the calculated discount rate to the intermediate reward (Step S1524). Thereafter, the first operation section 111 determines whether or not to allocate the discount rate to all positive intermediate rewards (Step S1525).

If it is determined that the acquired placement time matches the target time by contrast, the first operation section 111 determines not to allocate the discount rate to the intermediate reward (No in Step S1522). The first operation section 111 having determined not to allocate the discount rate to the intermediate reward determines whether or not determination as whether or not to allocate the discount rate is done for all positive intermediate rewards (Step S1525).

If the first operation section 111 determines that determination as to whether or not to allocate the discount rate has been done for all the positive intermediate rewards (Yes in Step S1525), the processing depicted in FIG. 14 ends. If the first operation section 111 determines that determination as to whether or not to allocate the discount rate has been done for not all the positive intermediate reward (No in Step S1525), the processing returns to Step S1521. As such, the processing of Steps S1521 to S1525 is repeated until it is determined that determination as to whether or not to allocate the discount rate has been done for all the positive intermediate rewards.

Figure 15:
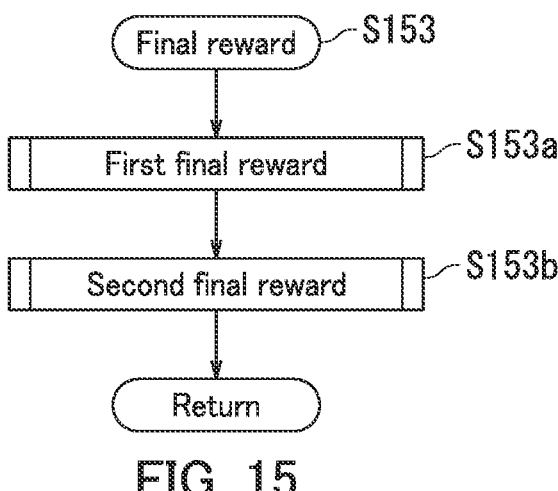
FIG. 15 is a flowchart depicting a processing flow of final reward acquisition.

Processing of final reward acquisition (Step S153) will be descried next with reference to FIG. 15. FIG. 15 is a flowchart depicting a flow of the processing of final reward acquisition. As depicted in FIG. 15, the processing of final reward acquisition includes Steps S153a and S153b.

The first operation section 111 acquires a first final reward that is a positive reward in Step S153a. The first operation section 111 acquires a second final reward that is a positive reward in Step S153b. When the first operation section 111 acquires the first final reward and second final reward, the processing depicted in FIG. 15 ends.

Figure 16:
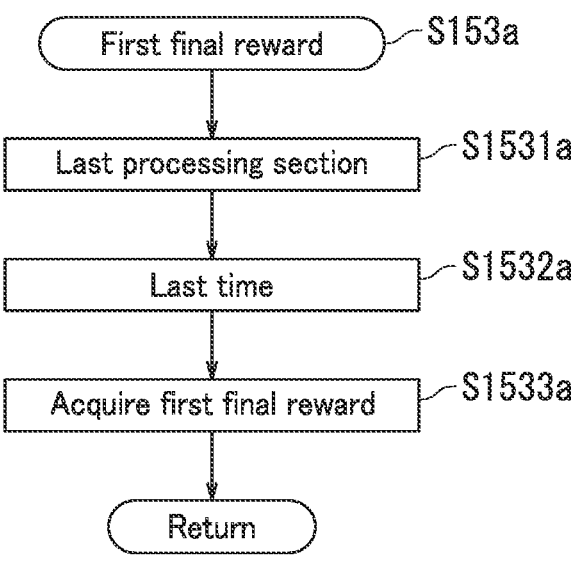
FIG. 16 is a flowchart depicting a flow of processing of acquiring a first final reward.

Processing of first final reward acquisition (Step S153a) will be descried next with reference to FIG. 16. FIG. 16 is a flowchart depicting a flow of the processing of first final reward acquisition. As depicted in FIG. 16, the processing of first final reward acquisition includes Steps S1531a to S1533a.

Once the processing of first final reward acquisition starts, the first operation section 111 specifies a last processing section that processes a substrate W last from among the processing sections PU based on the timetable TB in which all the patterns PT have been placed (Step S1531a).

The first operation section 111 having specified a last processing section acquires a time (last time) at which the last processing section processes a substrate W last from among the times indicated by the timetable TB.

The first operation section 111 having acquired the last time acquires a first final reward based on the last time (Step S1533a), and the processing depicted in FIG. 16 ends. Specifically, the earlier the last time is, the larger the value of the first final reward is. That is, the time schedule according to which a preset number of substrates W can be process in a shorter time has a larger value of the first final reward. Accordingly, a time schedule according to which the substrates W can be further efficiently processed can be created with the first final reward.

Figure 17:
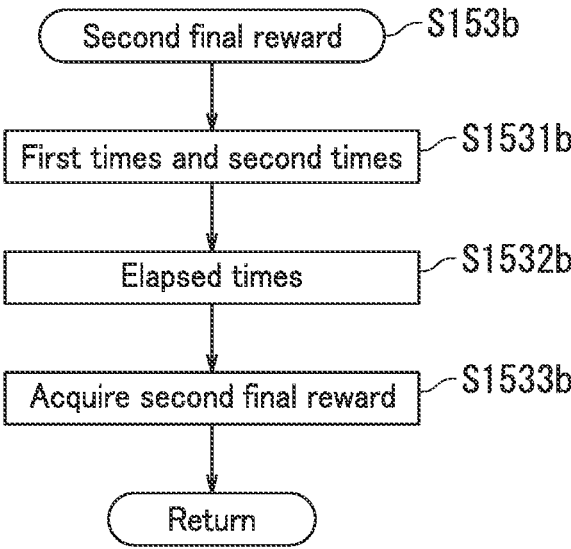
FIG. 17 is a flowchart depicting a flow of processing of acquiring a second final reward.

Processing of second final reward acquisition (Step S153b) will be descried next with reference to FIG. 17. FIG. 17 is a flowchart depicting a flow of the processing of second final reward acquisition. As depicted in FIG. 17, the processing of second final reward acquisition includes Steps S1531b to S1533b.

Once the processing of second final reward acquisition starts, the first operation section 111 acquires first times T1 and second times T2 from the times indicated by the timetable TB (Step S1531b). Here, the first times T1 each are a time at which a corresponding one of the processing sections PU processes a substrate W first and the second times T2 each are a time at which a corresponding one of the processing sections PU processes the substrate W last.

The first operation section 111 having acquired the first times T1 and the second times T2 acquires elapsed times from the first times T1 to the second times T2 in the respective processing section PU (Step S1532*b*).

The first operation section 111 having acquired the elapsed time of each processing section PU acquires a second final reward based on a distribution of the elapsed times (Step S1533*b*). The processing depicted in FIG. 17 ends then. Specifically, the smaller the distribution of the elapsed times is, the larger the value of the second final reward is. Accordingly, a time schedule according to which the processing sections PU are further evenly used can be created with the second final reward. As a result, a time schedule according to which the substrates W can be processed further efficiently can be created.

The first embodiment has been described so far with reference to FIGS. 1 to 17. According to the present embodiment, a part of the processing of schedule creation can be implemented through machine learning, with a result that there is no need for the developer to develop the entire flow for each model of apparatuses. Specifically, it is only required for the developer to develop a flow of processing executed by the first operation section 111 for each model of apparatuses. Therefore, burden on the developer can be reduced.

Second Embodiment

Figure 18:
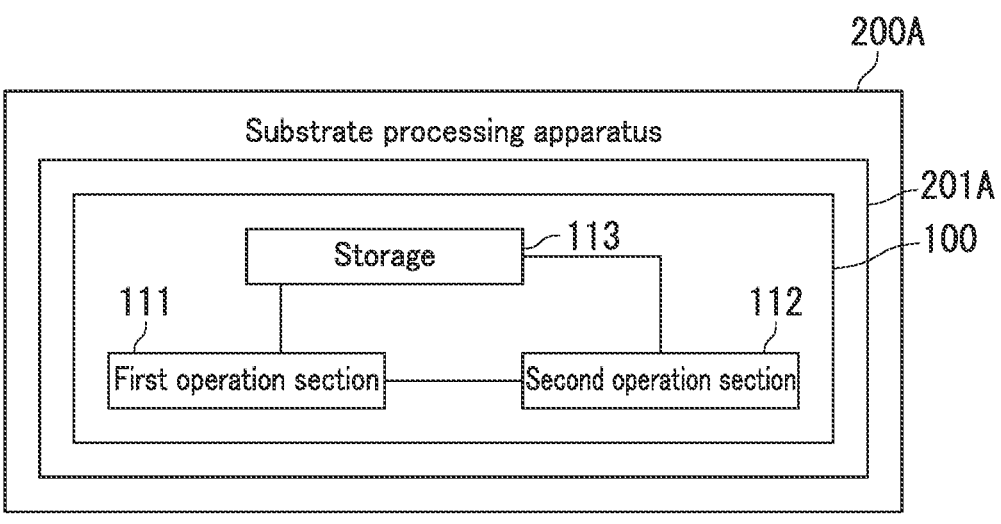
FIG. 18 is a diagram illustrating a substrate processing apparatus according to a second embodiment.

With reference to FIG. 18, a second embodiment will be descried next. However, the following describes features differing from those of the first embodiment and description of the same features as those of the first embodiment is omitted. The second embodiment differs from the first embodiment in a substrate processing apparatus 200A including the schedule creating device 100.

FIG. 18 is a diagram illustrating the substrate processing apparatus 200A of the present embodiment. As illustrated in FIG. 18, the substrate processing apparatus 200A includes a controller 201A. The controller 201A controls each element of the substrate processing apparatus 200A. For example, the substrate processing apparatus 200A may include four substrate containers C, an indexer robot IR, a transport robot CR, and four processing sections PU likewise the substrate processing apparatus WP illustrated in FIG. 2. In this case, the controller 201A controls the indexer robot IR, the transport robot CR, and the four processing sections PU.

The controller 201A includes the schedule creating device 100. The schedule creating device 100 creates a time schedule for each element relating to the processing sequence of a substrate Was described in the first embodiment. For example, the schedule creating device 100 creates a time schedule for the indexer robot IR, the transport robot CR, and the four processing sections PU.

More specifically, the controller 201A includes the first operation section 111, the second operation 112, and the storage 113. In the present embodiment, the storage 113 further stores recipe data therein. The recipe data contains information indicating a plurality of recipes. Each of the recipes defines for example processing details and a processing sequence of a substrate W. Furthermore, the first operation section 111 controls each element of the substrate processing apparatus 200A based on the recipe data and a time schedule. In detail, the first operation section 111 manages schedules for the respective elements of the substrate processing apparatus 200A based on the time schedule.

The second embodiment has been described so far with reference to FIG. 18. According to the present embodiment, a part of the processing of schedule creation can be implemented through machine learning likewise in the first embodiment, with a result that there is no need for the developer to develop the entire flow for each model of apparatuses. Therefore, burden on the developer can be reduced.

Although the first operation section 111 of the schedule creating device 100 manages the schedules of the respective elements of the substrate processing apparatus 200A in the present embodiment, the substrate processing apparatus 200A may further include a controller that manages the schedules of the respective elements of the substrate processing apparatus 200A separate from the schedule creating device 100.

In addition, although the storage 113 of the schedule creating device 100 stores the recipe data therein in the present embodiment, the substrate processing apparatus 200A may further includes storage that stores therein the recipe data separate from the storage 113 of the schedule creating device 100.

Third Embodiment

Figure 19:
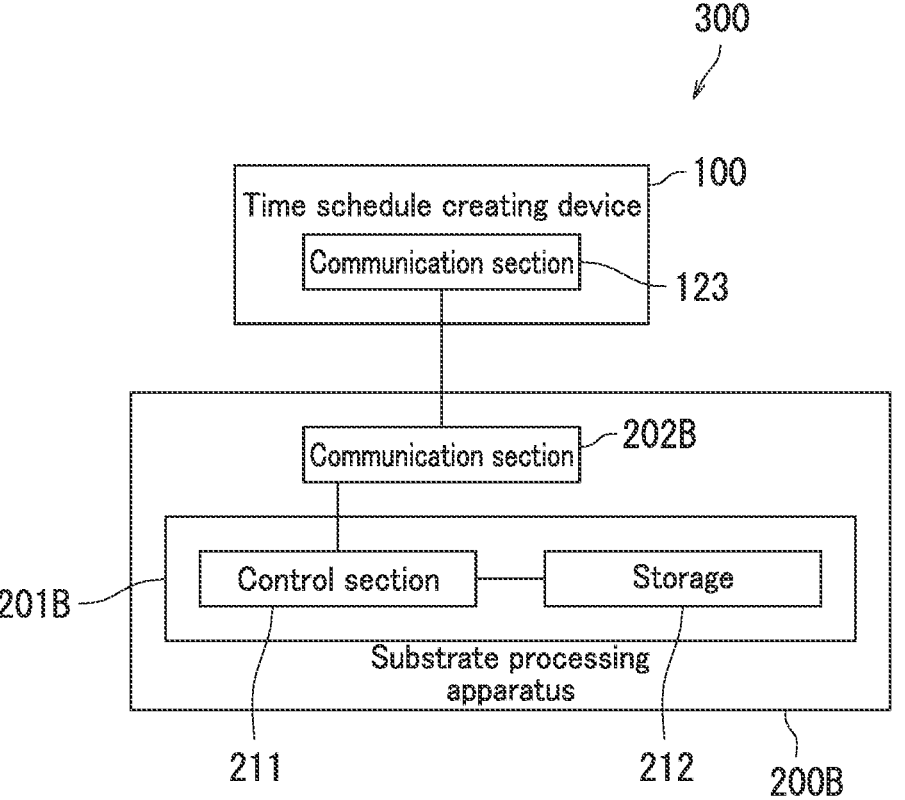
FIG. 19 is a diagram illustrating a substrate processing apparatus according to a third embodiment.

With reference to FIG. 19, a third embodiment will be described next. However, the following describes features differing from those of the first and second embodiments and description of the same features as those of the first and second embodiments is omitted. The third embodiment differs from the first embodiment in that the schedule creating device 100 and a substrate processing apparatus 200B are connected to each other in a communicable manner.

FIG. 19 is a diagram illustrating a substrate processing system 300 of the present embodiment. As illustrated in FIG. 19, the substrate processing system 300 includes the schedule creating device 100 and a substrate processing apparatus 200B.

The schedule creating device 100 creates a time schedule for each element relating to a processing sequence of a substrate W as described in the first embodiment. The schedule creating device 100 in the present embodiment further includes a communication section 123.

The communication section 123 is connected to a network to perform communication with the substrate processing apparatus 200B. Examples of the network includes the Internet, a local area network (LAN), a public telephone network, and a short-range wireless network. The communication section 123 is a communication tool and may be a network interface controller, for example. The communication section 123 transmits a time schedule to the substrate processing apparatus 200B.

The substrate processing apparatus 200B includes a communication section 202B. The communication section 202B is connected to the network to perform communication with the communication section 123 of the schedule creating device 100. The communication section 202B is a communication tool and may be a network interface controller, for example. The communication section 202B receives a time schedule from the substrate processing apparatus 200B. The communication section 202B is an example of a receiving section.

The substrate processing apparatus 200B further includes a controller 201B. The controller 201B controls each element of the substrate processing apparatus 200B. For example, the substrate processing apparatus 200B may include four substrate containers C, an indexer robot IR, a transport robot CR, and four processing sections PU likewise the substrate processing apparatus WP illustrated in FIG. 2. In this case, the controller 201B controls the indexer robot IR, the transport robot CR, and the four processing sections PU. More specifically, the controller 201B includes a control section 211 and storage 212.

The control section 211 includes a processor. The control section 211 includes a CPU or a MPU, for example. Alternatively, the control section 211 may include a general-purpose arithmetic unit or a dedicated arithmetic unit. The control section 211 controls each element of the substrate processing apparatus 200B based on control programs and data stored in the storage 212.

The storage 212 stores control programs and data therein. The control programs are computer programs. The data includes recipe data. The storage 212 includes a main storage device. The main storage device is semiconductor memory, for example. The storage 212 may further include an auxiliary storage device. The auxiliary storage device includes at least one of semiconductor memory and a hard disk drive, for example. The storage 212 may include a removable medium.

The control section 211 stores the time schedule received by the communication section 202B in the storage 212 in the present embodiment. The control section 211 controls each element of the substrate processing apparatus 200B based on the recipe data and the time schedule. In detail, the control section 211 manages the schedules for the respective elements of the substrate processing apparatus 200B based on the time schedule. The control section 211 is an example of a managing section.

The third embodiment has been described so far with reference to FIG. 19. According to the present embodiment, a part of the processing of schedule creation can be implemented through machine learning likewise in the first and second embodiments, with a result that there is no need for the developer to develop the entire flow for each model of apparatuses. Therefore, burden on the developer can be reduced.

The embodiments of the present disclosure have been described so far with reference to the drawings (FIGS. 1 to 19). However, the present disclosure is not limited to the above embodiments and can be practiced in various manners within a scope not departing from the gist of the present disclosure. Furthermore, the elements of configuration disclosed in the above embodiments may be altered as appropriate. For example, some of all the elements of configuration indicated in some embodiment may be added to the elements of configuration in another embodiment or some of all the elements of configuration indicated in some embodiment may be deleted from the embodiment.

The drawings schematically illustrate elements of configuration in order to facilitate understanding. Properties such as thickness, length, number, and intervals of each element of configuration illustrated in the drawings may differ from actual properties thereof in order to aid preparation of the drawings. Also, the configuration of each element of configuration described in the above embodiments is merely an example and not intended as a specific limitation. Various alterations may be made within a scope not substantially departing from the effects of the present invention.

For example, the substrate processing apparatus WP, the substrate processing apparatus 200A, and the substrate processing apparatus 200B in the embodiments described with reference to FIGS. 1 to 19 are of single-wafer type. However, the substrate processing apparatus WP, the substrate processing apparatus 200A, and the substrate processing apparatus 200B may be of batch type.

Furthermore, the patterns PT are placed in the timetable TB in block units in the embodiments described with reference to FIGS. 1 to 19 but may be placed in the timetable TB in pattern units.

The reward includes a final reward and an intermediate reward in the embodiments described with reference to FIGS. 1 to 19, but may include only the final reward of the final reward and the intermediate reward.

The discount rate is allocated to a positive intermediate reward in the embodiments described with reference to FIGS. 1 to 19, but may not be allocated to any intermediate rewards.

The discount rate changes according to the placement time in the embodiments described with reference to FIGS. 1 to 19, but may be constant. The final reward includes the first final reward and the second final reward in the embodiments described with reference to FIGS. 1 to 19, but may include only one of the first final reward and the second final reward.

The schedule creating device MO in the embodiments described with reference to FIGS. 1 to 19 includes two operation section (the first operation section 111 and the second operation section 112), but may include one operation section. In this case, the one operation section executes the processing executed by the first operation section 111 and the processing executed by the second operation section 112.

Example

The following provides more specific description of the subject matter of the present application through use of an example. Note that the subject matter of the present application is not limited to the scope of the example.

Figure 20:
FIG. 20 is a diagram illustrating patterns used in an example.
Figure 21:
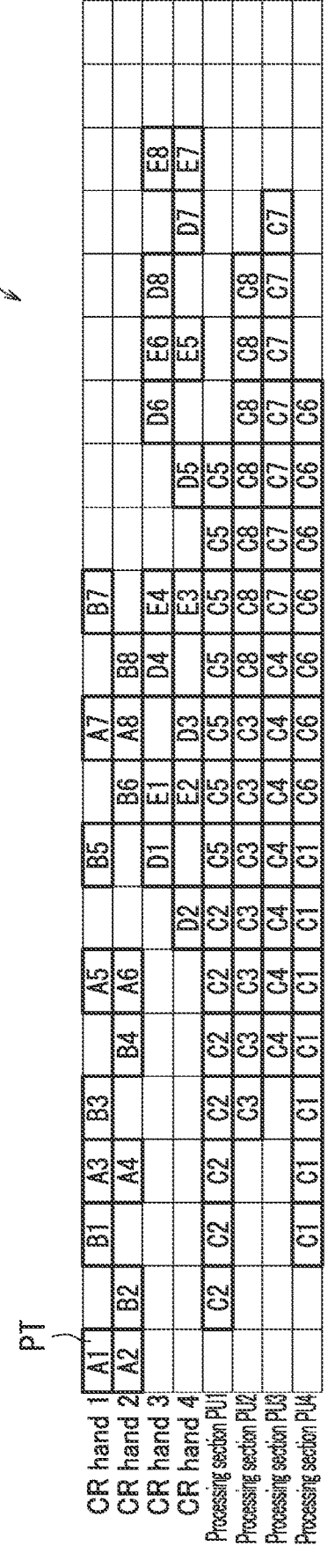
FIG. 21 is a diagram illustrating a time schedule created in the example.
Figure 22:
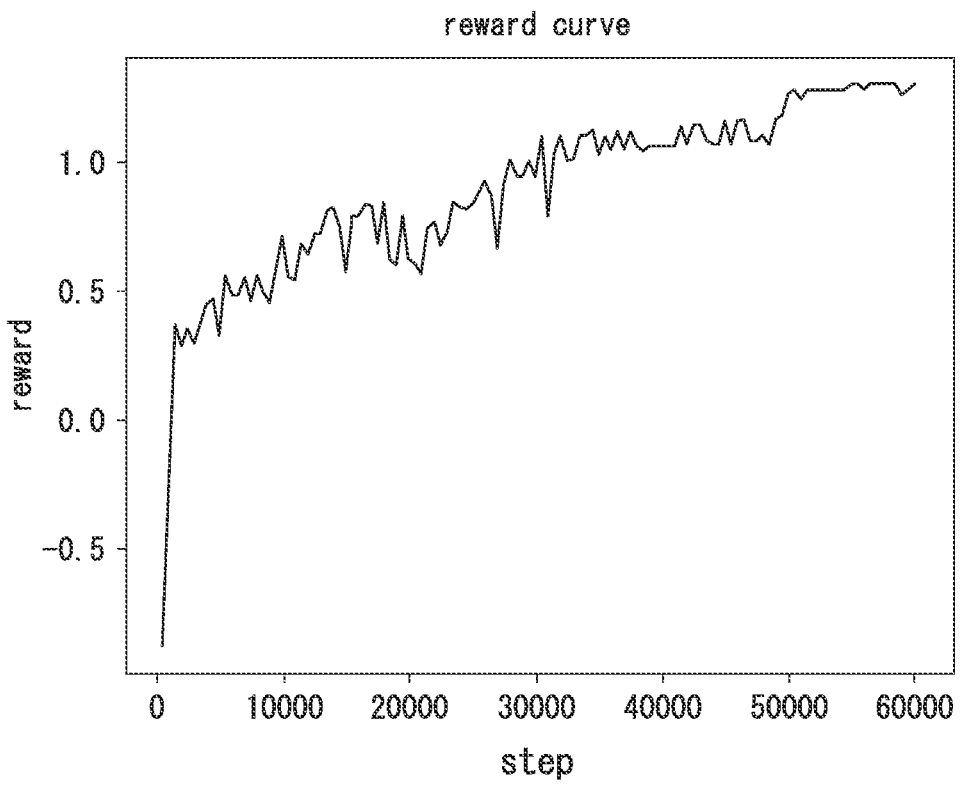
FIG. 22 is a diagram illustrating a learning curve obtained in the example.

FIG. 20 is a diagram illustrating patterns PT used in the present example. FIG. 21 is a diagram illustrating a time schedule created in the present example. FIG. 22 is a diagram illustrating a learning curve obtained in the present example. In FIG. 22, the horizontal axis indicates the learning number (the number of times the learning step was repeated). The vertical axis indicates the acquired reward.

The substrate processing apparatus WP, which corresponds to a timetable TB given as an environment of the reinforcement learning in the present example, includes a transport robot CR and four processing sections PU (processing sections PU1 to PU4). The transport robot CR includes four hands (CR hands 1 to 4) that operate independently.

Constraint conditions 1 to 9 shown below in Table 4 were given as the constraint condition.

TABLE 4

| Constraint condition | Details of constraint condition |
|---|---|
| Constraint condition 1 | Processing proceeds in the order of a processing sequence. |
| Constraint condition 2 | Two hands of the transport robot CR transport a non-processed substrate W. |
| Constraint condition 3 | The two hands that transport respective non-processed substrates W are capable of transporting the substrates W simultaneously. |
| Constraint condition 4 | The other two hands of the transport robot CR transport a processed substrate W. |
| Constraint condition 5 | The two hands that transport respective processed substrates W are capable of transporting the substrates W simultaneously. |
| Constraint | The processing sections PU process substrates W |

TABLE 4-continued

| Constraint condition | Details of constraint condition |
|---|---|
| condition 6 | one at a time. |
| Constraint condition 7 | Simultaneous bringing-in of substrates W into the processing sections PU is disabled. |
| Constraint condition 8 | Simultaneous bringing-out of substrates W out of the processing sections PU is disabled. |
| Constraint condition 9 | The patterns PT are placed in block units. |

Patterns A to F illustrated in FIG. 20 were given as the patterns PT. The pattern A indicates processing in which a hand for transporting a non-processed substrate W grips a non-processed substrate W. The pattern B indicates processing in which the hand for transporting a non-processed substrate W transports and brings the non-processed substrate W into a processing section PU. The pattern C indicates processing in which the non-processed substrate W is brought into a processing section PU, processed by the processing section PU, and brought out of the processing section PU. The pattern D indicates processing in which a hand for transporting a processed substrate W grips the processed substrate W. The pattern E indicates processing in which the hand for transporting a processed substrate W transports and brings the processed substrate W out of the processing section PU.

In the present example, the first to third intermediate rewards and the first and second final rewards described in the first embodiment were granted each as a reward. Furthermore, the discount rate described in the first embodiment was allocated to the first intermediate reward and the second intermediate reward in the present example.

In the present example, a time schedule for processing eight substrates W was created. The timetable TB illustrated in FIG. 21 is a timetable with the largest evaluation value in the present example. As illustrated in FIG. 21, a time schedule according to which the substrates W can be efficiently processed was created. Furthermore, approximately 50000-time repetition of the learning step converges the reward on the target value as illustrated in FIG. 22.

What is claimed is:

1. A substrate processing apparatus comprising:
respective elements relating to a substrate processing sequence; and
a schedule creating device that creates through machine learning a time schedule for the respective elements, wherein
the schedule creating device includes at least one processor and a non-transitory storage medium that stores therein a program;
the processor creates, by executing the program, the time schedule by executing a learning step multiple times;
the learning step is processing of: sequentially placing patterns in a timetable for defining the time schedule for the elements of the substrate processing apparatus, the patterns being prepared in advance and each indicating a procedure in the substrate processing sequence; and acquiring an evaluation value after all the patterns have been placed in the timetable;
the processor executes the program so as to:
acquire one or more placeable patterns that are allowed to be placed in the timetable from among the patterns based on a prescribed constraint condition;

predict and select through the machine leaning a pattern that makes an evaluation value maximum from among the one or more placeable patterns; and
update the timetable by placing the selected pattern in the timetable,
after all the patterns prepared in advance have been placed in the timetable, the processor executes the program so as to:
specify a last time at which the substrate is processed last and acquire a final reward wherein the earlier the last time is, the larger the final reward is; and
calculate the evaluation value based on a reward including the final reward, and
the processor controls the respective elements based on the created time schedule.

2. The substrate processing apparatus according to claim 1, wherein
the constraint condition includes a condition for acquiring from among the patterns a succeedingly placeable pattern that is allowed to be placed next according to an order of the substrate processing sequence.

3. The substrate processing apparatus according to claim 1, wherein
the constraint condition includes a condition for prohibiting execution of an operation that the substrate processing apparatus is physically disabled to perform.

4. The substrate processing apparatus according to claim 1, wherein
the elements of the substrate processing apparatus include a plurality of processing sections that each perform substrate processing,
the final reward includes a specific final reward that is a positive reward, and
the acquiring a final reward includes:
specifying a last processing section that is a processing section of the processing sections that performs the substrate processing last;
acquiring a time at which the last processing section performs the substrate processing last from among times indicated by the timetable; and
acquiring the specific final reward based on the acquired time.

5. The substrate processing apparatus according to claim 1, wherein
the elements of the substrate processing apparatus includes a plurality of processing sections that each perform substrate processing,
the final reward includes a specific final reward that is a positive reward, and
the processor executes the program so as to:
acquire first times and second times from times indicated by the timetable, the first times each being a time at which a corresponding one of the processing sections performs the substrate processing first, the second times each being a time at which a corresponding one of the processing sections performs the substrate processing last;
acquire elapsed times from the first times to the second times of the respective processing sections; and
acquire the specific final reward based on a distribution of the elapsed times.

6. The substrate processing apparatus according to claim 1, wherein
the reward further includes an intermediate reward, and
the processor further executes, by executing the program:
determining, after the updating the timetable by placing the selected pattern in the timetable, whether or not a pattern of the patterns that is placed latest in the timetable meets a prescribed intermediate reward grant condition; and acquiring the intermediate reward when it is determined that the pattern placed latest meets the prescribed intermediate reward grant condition.

7. The substrate processing apparatus according to claim 6, wherein, in calculating the evaluation value, the processor executes, by executing the program:

acquiring a time corresponding to a position of the pattern that meets the prescribed intermediate reward grant condition from among times indicated by the timetable;

determining whether or not to allocate a discount rate to the intermediate reward based on the acquired time; and calculating, when it is determined to allocate the discount rate to the intermediate reward, a value of the discount rate according to the acquired time.

8. The substrate processing apparatus according to claim 6, wherein the elements of the substrate processing apparatus include a transport robot capable of transporting a plurality of substrates simultaneously, the intermediate reward includes a specific intermediate reward that is a positive reward, the intermediate reward grant condition includes a specific intermediate reward grant condition corresponding to the specific intermediate reward, and the specific intermediate reward grant condition indicates simultaneous transport of mutually different substrates by the transport robot.

9. The substrate processing apparatus according to claim 6, wherein the elements of the substrate processing apparatus include a processing section that performs substrate processing, the intermediate reward includes a specific intermediate reward that is a positive reward, the intermediate reward grant condition includes a specific intermediate reward grant condition corresponding to the specific intermediate reward, and the specific intermediate reward grant condition indicates bringing-in of a substrate into the processing section directly after bringing-out of another substrate from the processing section.

10. The substrate processing apparatus according to claim 6, wherein the patterns includes a first pattern and a second pattern, of times indicated by the timetable, a time corresponding to a position at which the first pattern is placed is earlier than a time at which the second pattern is placed, the intermediate reward includes a specific intermediate reward that is a negative reward, the intermediate reward grant condition includes a specific intermediate reward grant condition corresponding to the specific intermediate reward, and the specific intermediate reward grant condition indicates placement of the first pattern in the timetable after placement of the second pattern in the timetable.

11. A substrate processing system comprising:

a substrate processing apparatus including respective elements relating to a substrate processing sequence; and a schedule creating device that creates through machine learning a time schedule for the respective elements, wherein the schedule creating device includes at least one processor and a non-transitory storage medium that stores therein a program, the processor creates, by executing the program, the time schedule by executing a learning step multiple times, the learning step is processing of: sequentially placing patterns in a timetable for defining the time schedule for the elements of the substrate processing apparatus, the patterns being prepared in advance and each indicating a procedure in the substrate processing sequence; and acquiring an evaluation value after all the patterns have been placed in the timetable, the processor executes the program so as to;

acquire one or more placeable patterns that are allowed to be placed in the timetable from among the patterns based on a prescribed constraint condition;

predict and select through the machine leaning a pattern that makes an evaluation value maximum from among the one or more placeable patterns; and update the timetable by placing the selected pattern in the timetable;

after all the patterns prepared in advance have been placed in the timetable, the processor executes the program so as to:

specify a last time at which the substrate is processed last and acquire a final reward wherein the earlier the last time is, the larger the final reward is; and calculate the evaluation value based on a reward including the final reward, the substrate processing apparatus further includes:

a receiving section configured to receive the time schedule from the schedule creating device; and at least one processor configured to control the respective elements based on the time schedule received by the receiving section.

* * * * *